United States Patent
Sakuma

(10) Patent No.: US 11,181,716 B2
(45) Date of Patent: Nov. 23, 2021

(54) CONVERTER LENS AND CAMERA APPARATUS INCLUDING THE SAME

(71) Applicant: CANON KABUSHIKI KAISHA, Tokyo (JP)

(72) Inventor: Koichi Sakuma, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 366 days.

(21) Appl. No.: 16/014,583

(22) Filed: Jun. 21, 2018

(65) Prior Publication Data
US 2018/0372991 A1    Dec. 27, 2018

(30) Foreign Application Priority Data

Jun. 26, 2017    (JP) .............................. JP2017-123968

(51) Int. Cl.
*G02B 7/02* (2021.01)
*G02B 3/00* (2006.01)
(Continued)

(52) U.S. Cl.
CPC ............... *G02B 7/14* (2013.01); *G02B 13/06* (2013.01); *G02B 15/144113* (2019.08); *H04N 5/335* (2013.01); *H04N 5/2254* (2013.01)

(58) Field of Classification Search
CPC ........ G02B 7/14; G02B 25/002; G02B 7/021; G02B 7/02; G02B 7/023; G02B 7/04;
(Continued)

(56) References Cited

U.S. PATENT DOCUMENTS

| 9,612,425 B2 | 4/2017 | Yonezawa |
| 9,638,892 B2 | 5/2017 | Kikuchi |

(Continued)

FOREIGN PATENT DOCUMENTS

| JP | 2014170043 A | 9/2014 |
| JP | 2015225204 A | 12/2015 |

(Continued)

OTHER PUBLICATIONS

English translation of Office Action issued in Japanese Appln. No. 2017-123968 dated Mar. 30, 2021.

*Primary Examiner* — Dawayne Pinkney
(74) *Attorney, Agent, or Firm* — Rossi, Kimms & McDowell LLP

(57) ABSTRACT

Provided is a converter lens arranged between an interchangeable lens and an image pickup apparatus, wherein a distance from a most-object-side lens surface vertex to an object point of the converter lens, a distance L from the most-object-side lens surface vertex to a most-image-side lens surface vertex, and a most-image-side distance from the lens surface vertex to an image point of the converter lens are properly set, wherein, at least one negative lens included in a rear lens unit composed of lenses satisfying LN>0.5×L where LN is a most-object-side distance from the lens surface vertex to a surface vertex on the object side of the lenses, satisfies ΘgF>−0.00162×vd+0.654, where ΘgF is relative partial dispersion and vd is Abbe number in d-line, and an average focal length of the at least one negative lens, and a focal length of an entire system of the converter lens are properly set.

10 Claims, 20 Drawing Sheets

(51) Int. Cl.
  *G03B 17/00*   (2021.01)
  *G02B 7/14*   (2021.01)
  *G02B 13/06*   (2006.01)
  *H04N 5/335*   (2011.01)
  *G02B 15/14*   (2006.01)
  *H04N 5/225*   (2006.01)

(58) Field of Classification Search
  CPC . G02B 7/08; G02B 3/00; G02B 15/10; G02B 15/08; G02B 15/04; G02B 15/02; G02B 13/0015; G02B 15/12; G02B 9/60; G02B 9/62; G02B 9/64; G11B 7/0932; G11B 7/0935; G03B 17/14; H04N 5/2254
  USPC .................. 359/811–830, 642, 672, 675; 396/529–530
  See application file for complete search history.

(56) References Cited

U.S. PATENT DOCUMENTS

| | | |
|---|---|---|
| 2016/0274443 A1 | 9/2016 | Ogata |
| 2017/0031139 A1* | 2/2017 | Shimomura ........... G02B 13/02 |

FOREIGN PATENT DOCUMENTS

| | | |
|---|---|---|
| JP | 2016177042 A | 10/2016 |
| JP | 2016191761 A | 11/2016 |
| JP | 2017026984 A | 2/2017 |

* cited by examiner

CONVERTER LENS AND CAMERA APPARATUS INCLUDING THE SAME

BACKGROUND OF THE INVENTION

Field of the Invention

The present invention relates to a converter lens, which is removably mounted to an image side of an interchangeable lens to change a focal length of an entire system of the converter lens, and to a camera apparatus including the converter lens. More specifically, the present invention relates to a converter lens and a camera apparatus including the converter lens that are suited for use in, for example, a broadcasting television camera, a cinema camera, a film camera, and a video camera.

Description of the Related Art

Hitherto, for broadcasting television cameras, cinema cameras, film cameras, video cameras, and other cameras, there have been proposed converter lenses arranged on an image side of an interchangeable lens in order to change a focal length of the interchangeable lens, to thereby convert the focal length of the interchangeable lens. Among those converter lenses, there has been known a converter lens to be used to enable the interchangeable lens to adapt to a different camera format. For example, in Japanese Patent Application Laid-Open No. 2014-170043 and Japanese Patent Application Laid-Open No. 2015-225204, there has been proposed a converter lens arranged between a lens dedicated to a ⅔-inch-format camera having a color separation optical system and an image pickup apparatus to enable the converter lens to adapt to a super-35-mm-format camera. In Japanese Patent Application Laid-Open No. 2017-26984, there has been proposed an image pickup apparatus including an optical system having a function of increasing the focal length of the interchangeable lens.

In recent years, image pickup apparatus such as broadcasting television cameras, cinema cameras, film cameras, and video cameras are desired to have a larger number of pixels and higher sensitivity. In order to achieve a larger number of pixels, a pixel pitch is required to be reduced, but a certain pixel size is required to achieve higher sensitivity, and hence an image pickup apparatus including a large image pickup element is required. Meanwhile, a user desires to use existing interchangeable lens property. Therefore, for example, there are needs of using the ⅔-inch-format interchangeable lens on an image pickup apparatus including a larger image pickup element. In this case, it is required to arrange, between the interchangeable lens and the image pickup element, an optical system configured to increase the focal length of the interchangeable lens to enlarge an image size of the interchangeable lens. A converter lens to be used in such an application is required to sufficiently suppress various aberrations in order to enable acquisition of a high-resolution image corresponding to the larger number of pixels.

However, in Japanese Patent Application Laid-Open No. 2014-170043 and Japanese Patent Application Laid-Open No. 2015-225204, there is a margin for improvement in glass material of a lens unit on an image plane side, which is effective for correction of a chromatic aberration of magnification, and correction of a chromatic aberration of magnification is insufficient. Japanese Patent Application Laid-Open No. 2017-26984 is based on the presupposition that a filter is built in the optical system, and has a configuration in which a lens is arranged closer to the image side. Therefore, when the lens is arranged closer to the object side, the converter lens can achieve a more satisfactory aberration correction.

SUMMARY OF THE INVENTION

In view of this, the present invention has an object to provide a converter lens, which is configured to change a focal length of an interchangeable lens, and in which lenses are appropriately arranged and an appropriate glass material is used to downsize the converter lens and satisfactorily correct various aberrations, in particular, a chromatic aberration of magnification.

In order to achieve the above-mentioned object, according to one embodiment of the present invention, there is provided a converter lens, which is arranged between an interchangeable lens as an image pickup optical system and an image pickup apparatus, wherein a conditional expressions:

$1.1 < L/x < 3.3$; and $1.0 < L/y < 8.0$, are satisfied where x is a distance on an optical axis from a lens surface vertex closest to an object side to an object point of the converter lens, L is a distance on the optical axis from the lens surface vertex closest to the object side to a lens surface vertex closest to an image side, and y is a distance on the optical axis from the lens surface vertex closest to the image side to an image point of the converter lens, wherein a lens unit consisting of lenses, among lenses included in the converter lens, each satisfying a conditional expression, $LN > 0.5 \times L$, is set as a rear lens unit where LN is a distance on the optical axis from the lens surface vertex closest to the object side to a surface vertex on the object side of the lenses, at least one negative lens included in the rear lens unit satisfies a conditional expression:

$\theta gF > -0.00162 \times vd + 0.654$, where $\theta gF$ is a relative partial dispersion, and vd is an Abbe number with respect to a d-line, and wherein a conditional expression, $-5.0 < f\_neg/f\_conv < 0.6$, Is satisfied where f_neg is an average value of a focal length of the at least one negative lens, and f_conv is a focal length of an entire system of the converter lens.

In this case, the Abbe number vd and the relative partial dispersion $\theta gF$ are respectively defined as follows:

$vd = (Nd-1)/(NF-NC)$; and $\theta gF = (Ng-NF)/(NF-NC)$, where Ng, NF, Nd, and NC are refractive indices at a g-line having a wavelength of 435.8 nm, an F-line having a wavelength of 486.1 nm, a d-line having a wavelength of 587.6 nm, and a C-line having a wavelength of 656.3 nm of Fraunhofer lines, respectively.

According to the present invention, it is possible to obtain a converter lens, which is configured to change a focal length of an interchangeable lens, and in which lenses are appropriately arranged and an appropriate glass material is used to downsize the converter lens and satisfactorily correct various aberrations, in particular, a chromatic aberration of magnification.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, exemplary embodiments of the present invention are described in detail based on the attached drawings.

Embodiment 1

A converter lens according to one embodiment of the present invention is a converter lens arranged on an image side of an interchangeable lens for photography and having a function of increasing a focal length of the interchangeable lens.

In each lens cross-sectional view, the left side is an object side (front) and an image pickup optical system side, and the right side is an image side (rear). In each lens cross-sectional view, there are illustrated an interchangeable lens optical system ML for photography and a converter lens CL arranged between the interchangeable lens optical system and an image pickup plane.

The converter lens according to one embodiment of the present invention is mounted to the image side of the interchangeable lens to increase the focal length of the interchangeable lens of an entire system after the converter lens is mounted, to thereby enlarge an image circle.

Figure 1:
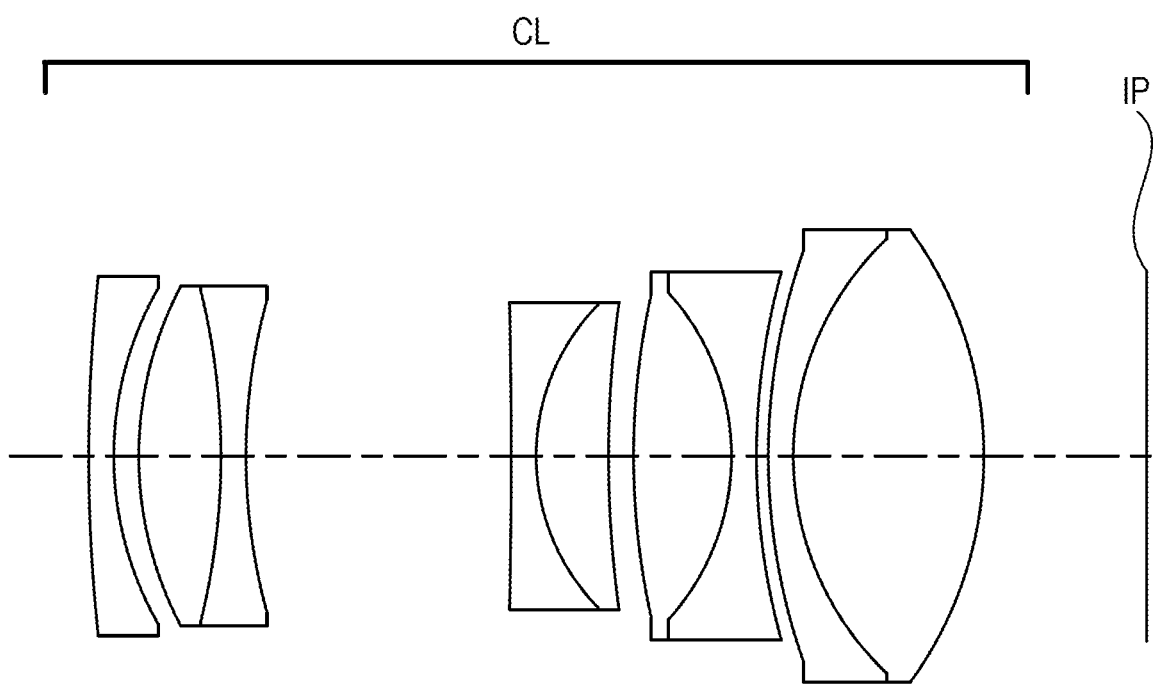
FIG. 1 is a lens cross-sectional view of a converter lens according to Embodiment 1 of the present invention.
Figure 2:
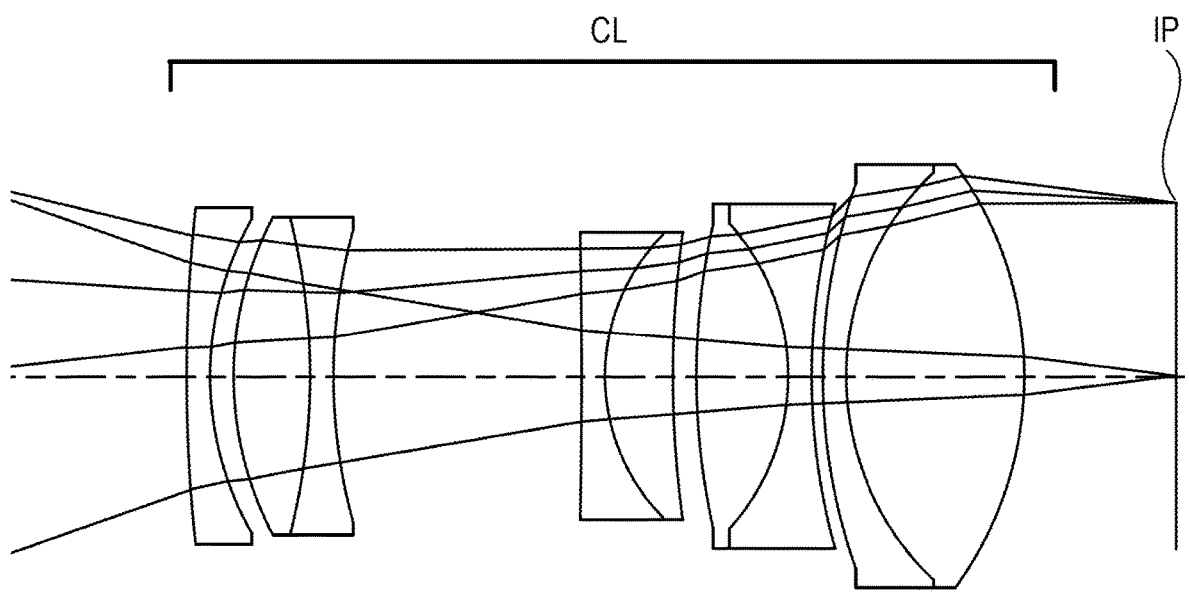
FIG. 2 is an optical path diagram of the converter lens according to Embodiment 1.
Figure 3:
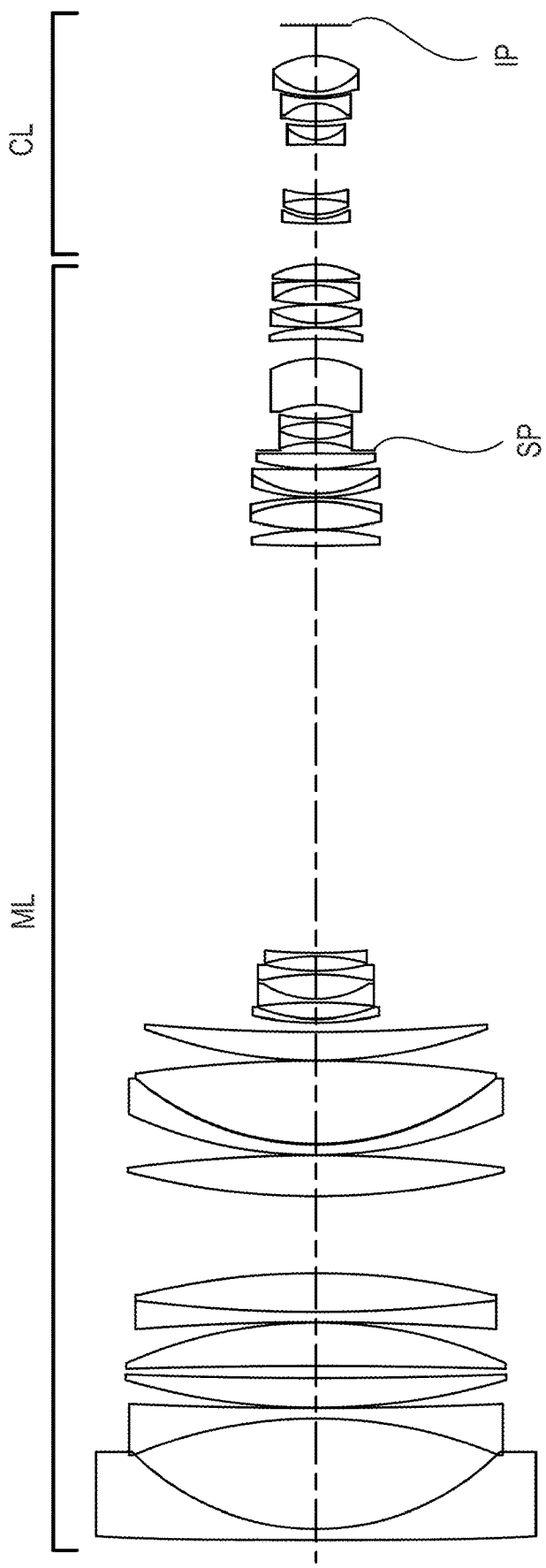
FIG. 3 is a lens cross-sectional view at the time when an interchangeable lens is focused at infinity at a wide angle end under a state in which the converter lens according to Embodiment 1 is mounted to the interchangeable lens.

FIG. 1 is a lens cross-sectional view of a converter lens according to Embodiment 1 (Numerical Embodiment 1) of the present invention. FIG. 2 is an optical path diagram of the converter lens according to Embodiment 1 (Numerical Embodiment 1) of the present invention. FIG. 3 is a lens cross-sectional view at the time when an interchangeable lens is focused at infinity at a wide angle end under a state in which the converter lens according to Embodiment 1 (Numerical Embodiment 1) of the present invention is mounted to the interchangeable lens.

The converter lens according to one embodiment of the present invention is arranged between the interchangeable lens as an image pickup optical system and an image pickup apparatus to increase a focal length of the interchangeable lens. In the converter lens, the following conditional expressions are satisfied:

$$1.1 < L/x < 3.3 \quad (1); \text{ and}$$

$$1.0 < L/y < 8.0 \quad (2),$$

where "x" represents a distance on an optical axis from a lens surface vertex closest to an object side to an object point of the converter lens, L represents a distance on the optical axis from the lens surface vertex closest to the object side to a lens surface vertex closest to an image side, and "y" represents a distance on the optical axis from the lens surface vertex closest to the image side to an image point of the converter lens. Further, when at least one negative lens among lens included in the converter lens satisfies the following conditional expressions:

$$LN > 0.5 \times L \quad (3); \text{ and}$$

$$\theta gF > -0.00162 \times vd + 0.654 \quad (4),$$

where LN represents a distance on the optical axis from the lens surface vertex closest to the object side to a surface vertex on the object side of the lenses, θgF represents a relative partial dispersion, and "vd" represents an Abbe number with respect to a d-line, the following conditional expression is satisfied:

$$-5.0 < f\_neg/f\_conv < 0.6 \quad (5)$$

where "f_neg" represents an average value of a focal length of the at least one negative lens, and "f_conv" represents a focal length of an entire system of the converter lens.

In this case, lenses in the converter lens satisfying Conditional Expression (3) are defined as a rear lens unit, and lenses therein not satisfying Conditional Expression (3) are defined as a front lens unit.

In Conditional Expression (1), "x" is equivalent to a distance on the optical axis between a lens surface vertex closest to the object side in the lenses of the converter lens and an image point of the interchangeable lens alone under a state in which the interchangeable lens is mounted to the converter lens. In Conditional Expression (2), "y" is equivalent to an air-equivalent back focus at the time when the converter lens is mounted to the interchangeable lens.

Next, optical actions obtained when Conditional Expressions (1) and (2) are satisfied are described with reference to FIG. 2. The converter lens configured to increase the focal length of the interchangeable lens tends to have a large difference between an axial ray ratio and an off-axial ray ratio on the image side. This phenomenon is inevitable because the difference between the axial ray ratio and the off-axial ray ratio is increased in the vicinity of an image forming point of the interchangeable lens, but this phenomenon is particularly remarkable in a converter lens having a function of enlarging an image size. The reason therefor is because, in the converter lens, a lens having a negative power is required to be arranged closer to the object side with respect to the image forming point of the interchangeable lens, and thus the off-axial ray ratio tends to be higher on the image plane side. Meanwhile, the axial ray ratio is decreased toward the image side, and hence a lens arranged on the image side is suitable for correction of aberrations relating to the off-axial ray.

When Conditional Expression (1) is satisfied, a difference can be given between ratios of the axial ray and the off-axial ray entering the converter lens from the interchangeable lens to obtain an optical system effective for aberration correction sharing. When a ratio exceeds the upper limit of Conditional Expression (1), the converter lens is disadvantageously upsized. When the ratio falls below the lower limit of Conditional Expression (1), the difference between ratios of the axial ray and the off-axial ray entering the converter lens from the interchangeable lens is decreased, and the entire length of the optical system becomes shorter. Therefore, a sufficient difference cannot be given between the ratios of the axial ray and the off-axial ray on the image side, and it becomes difficult to satisfactorily correct various aberrations, in particular, a distortion and an astigmatism.

When Conditional Expression (2) is satisfied, a difference can be given between ratios of the axial ray and the off-axial ray on the image side to obtain a lens arrangement effective for aberration correction sharing.

When a ratio exceeds the upper limit of Conditional Expression (2), the entire length of the converter lens is disadvantageously increased. When the ratio falls below the lower limit of Conditional Expression (2), the difference between the ratios of the axial ray and the off-axial ray on the image side is decreased, and various aberrations, in particular, a distortion and a chromatic aberration of magnification, cannot be sufficiently corrected.

When Conditional Expressions (3), (4), and (5) are satisfied, the negative lens having a large relative partial dispersion is arranged at a position having a high off-axial ray ratio on the image side, and thus an optical system suitable for correction of the chromatic aberration of magnification can be obtained.

Here, an Abbe number and a relative partial dispersion of a material of an optical element (lens) used in one embodiment of the present invention are described as follows. When refractive indices for a g-line (435.8 nm), an F-line (486.1 nm), a d-line (587.6 nm), and a C-line (656.3 nm) of Fraunhofer lines are represented by Ng, NF, Nd, and NC, respectively, an Abbe number "vd" and a relative partial dispersion θgF with respect to the g-line and the F-line are expressed as follows:

$$vd = (Nd-1)/(NF-NC); \text{ and}$$

$$\theta gF = (Ng-NF)/(NF-NC).$$

Existing optical materials have the relative partial dispersion θgF in a narrow range with respect to the Abbe number "vd". Moreover, the existing optical materials have tendencies that as the Abbe number "vd" becomes smaller, the relative partial dispersion θgF becomes larger, and that as the Abbe number "vd" becomes larger, the refractive index becomes lower. Here, a condition for correcting chromatic aberrations of a thin contact lens system, which includes two lenses 1 and 2 having refractive powers φ1 and φ2, respectively, and having Abbe numbers v1 and v2, respectively, is expressed as follows:

$$\varphi 1/v1 + \varphi 2/v2 = E.$$

Here, a combined refractive power "φ" of the lenses 1 and 2 is expressed as follows:

$$\varphi = \varphi 1 + \varphi 2$$

When E=0 is satisfied, image forming positions of the C-line and the F-line match in chromatic aberrations. At this time, φ1 and φ2 are expressed by the following expressions:

$$\varphi 1 = \varphi \times v1/(v1-v2); \text{ and}$$

$$\varphi 2 = \varphi \times v2/(v1-v2).$$

Figure 19:
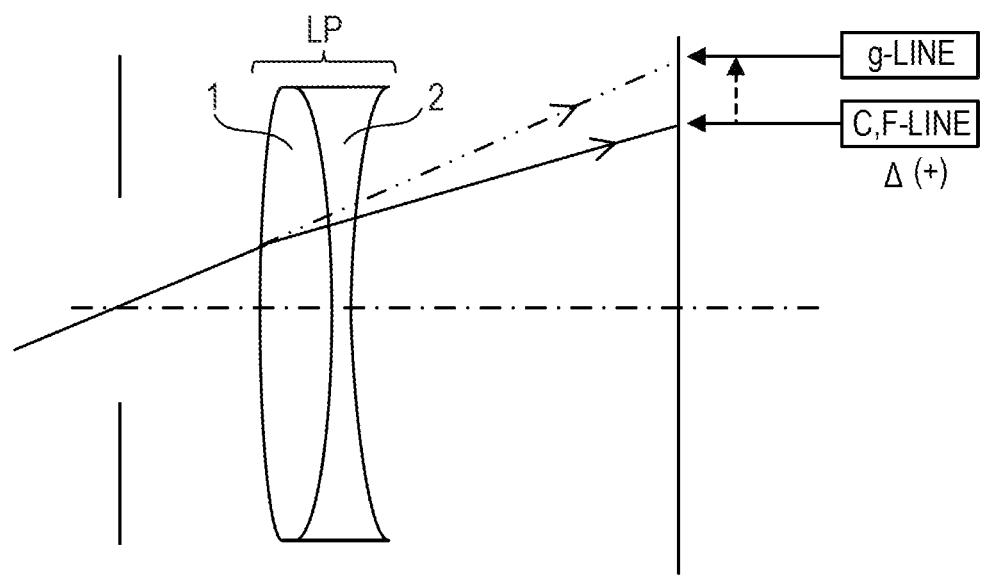
FIG. 19 is a schematic diagram relating to primary chromatic aberration correction of a chromatic aberration of magnification of a positive lens unit and a secondary spectrum.

Now, correction for, among the aberrations relating to the off-axial ray, a chromatic aberration of magnification is described with reference to FIG. 19. FIG. 19 is a schematic diagram relating to primary chromatic aberration correction of a chromatic aberration of magnification by a lens unit LP having a positive refractive power in the converter lens and a secondary spectrum. In chromatic aberration correction by the positive lens unit LP as illustrated in FIG. 19, a material having a large Abbe number v1 is used for the positive lens 1, and a material having a small Abbe number v2 is used for the negative lens 2. Therefore, the positive lens 1 has a small relative partial dispersion θ1, and the negative lens 2 has a large relative partial dispersion θ2. When the primary chromatic aberration of magnification is corrected at the C-line and the F-line, an image forming point of the g-line is shifted in a direction departing from the optical axis. When an amount of shift of the chromatic aberration of magnification at the g-line with respect to the C-line and the F-line is defined as a secondary spectrum amount ΔY, the secondary spectrum amount ΔY can be expressed as follows:

$$\Delta Y = (1/\varphi) \times (\theta 1 - \theta 2)/(v1-v2).$$

In order to satisfactorily correct the secondary spectrum of the chromatic aberration of magnification at the time when the converter lens is mounted to the interchangeable lens, it is required to adjust the amount of occurrence of the secondary spectrum at the lens on the image side at which the off-axial ray is high and the secondary spectrum of the chromatic aberration of magnification remarkably occurs. In the converter lens, in order to correct the Petzval sum, a glass material having a high refractive index and a low relative partial dispersion is often used for the negative lens, and a glass material having a low refractive index and a high relative partial dispersion is often used for the positive lens. Thus, the secondary spectrum amount tends to be negative. Therefore, in order to satisfactorily correct the secondary spectrum of the chromatic aberration of magnification at the time when the converter lens is mounted, it is required to select a glass material that increases the secondary spectrum amount $\Delta Y$.

Conditional Expression (3) defines a region on the image side in the converter lens.

Conditional Expression (4) defines a material having a large relative partial dispersion, which is effective for correcting the secondary spectrum of the chromatic aberration of magnification.

Conditional Expression (5) defines a refractive power of a lens having a negative refractive power and a large relative partial dispersion defined in Conditional Expression (4).

When a value falls below the lower limit of Conditional Expression (3), the negative lens having a large relative partial dispersion is arranged closer to the object side, and thus an effect of correcting the chromatic aberration of magnification cannot be sufficiently obtained.

When a value falls below the lower limit of Conditional Expression (4), the relative partial dispersion of the negative lens arranged on the image side is decreased too much, and the overcorrection of the secondary spectrum of the chromatic aberration of magnification cannot be sufficiently relaxed.

When a ratio exceeds the upper limit of Conditional Expression (5), the negative lens having a large relative partial dispersion cannot have a sufficient power, and thus the relaxation of the overcorrection of the secondary spectrum of the chromatic aberration of magnification becomes insufficient. When the ratio falls below the lower limit of Conditional Expression (5), the power of the negative lens is increased too much, and it becomes difficult to satisfactorily correct a curvature of field.

Further, in the present invention, a lateral magnification "$\beta$" of the converter lens is preferred to satisfy Conditional Expression (6):

$$2<\beta<3.5 \qquad (6).$$

When Conditional Expression (6) is satisfied, the off-axial ray ratio tends to be higher on the image side. When the converter lens has the above-mentioned configuration, the effect of correcting the chromatic aberration of magnification is enhanced.

When the upper limit of Conditional Expression (6) is not satisfied, the magnification caused by the converter lens is increased, and hence it becomes difficult to downsize the converter lens. When the lower limit of Conditional Expression (6) is not satisfied, the difference between ratios of the axial ray and the off-axial ray is decreased, and hence the effect of correcting the chromatic aberration of the present invention is decreased.

Further, in the present invention, when an average value of Abbe numbers of lenses having a positive refractive power included in the rear lens unit and an average value of relative partial dispersions of the lenses having a positive refractive power included in the rear lens unit are represented by "vrp" and "θrp", respectively, and an average value of Abbe numbers of lenses having a negative refractive power included in the rear lens unit and an average value of relative partial dispersions of the lenses having a negative refractive power included in the rear lens unit are represented by "vrn" and "θrn", respectively, it is desired to satisfy Conditional Expression (7):

$$-0.0091<(\theta rp-\theta rn)/(vrp-vrn)<-0.0025 \qquad (7).$$

Conditional Expression (7) defines a relationship of dispersion and relative partial dispersion of the positive lens and the negative lens in the rear lens unit to define a condition for satisfactorily correcting the secondary spectrum of the chromatic aberration of magnification.

When the upper limit of Conditional Expression (7) is not satisfied, the secondary spectrum is overcorrected at the rear lens unit having a high off-axial ray ratio, and thus it becomes difficult to satisfactorily correct the secondary spectrum of the chromatic aberration of magnification. When the lower limit of Conditional Expression (7) is not satisfied, strong refractive powers are given to the positive lens and the negative lens in order to correct the secondary spectrum, and hence it becomes difficult to satisfactorily correct various aberrations.

Further, in the present invention, when an average refractive index of lenses having a negative refractive power in the converter lens is represented by $Nn\_ave$, it is desired to satisfy Conditional Expression (8):

$$1.75<Nn\_ave<2.05 \qquad (8).$$

When Conditional Expression (8) is satisfied, a material having a high refractive index is used for a negative lens having a strong refractive power, and hence a curvature of the negative lens can be decreased and a spherical aberration can be satisfactorily corrected. Further, the Petzval sum can be effectively corrected, and the curvature of field can be satisfactorily corrected in a peripheral portion of the screen.

When the upper limit of Conditional Expression (8) is not satisfied, a material having a large diffusion is used for all of the negative lenses, and hence it becomes difficult to satisfactorily correct a chromatic aberration. When the lower limit of Conditional Expression (8) is not satisfied, a refractive power of the negative lens is decreased too much, and a spherical aberration and a curvature of field cannot be sufficiently corrected.

Further, in the present invention, when a focal length of a lens arranged closest to the image side among lens components having a positive refractive power is represented by $frear\_Lc$, it is preferred to satisfy Conditional Expression (9):

$$0.8<L/frear\_Lc<4.0 \qquad (9).$$

The lens component herein refers to a single lens or a cemented lens.

When Conditional Expression (9) is satisfied, downsizing can be achieved, and a distortion, which is mainly caused in a lens having a negative refractive power in the front lens unit, can be canceled. Thus, the distortion can be satisfactorily corrected.

When the upper limit of Conditional Expression (9) is not satisfied, the converter lens optical system becomes longer, and it becomes difficult to achieve the downsized entire system of the converter lens. When the lower limit of Conditional Expression (9) is not satisfied, the correction of the distortion by the lens component becomes insufficient, and hence it becomes difficult to satisfactorily correct the distortion.

Further, in the present invention, when a lens component having a negative refractive power is arranged closest to the object side in the converter lens, and a focal length of the lens component is represented by ffront_Lc, it is preferred to satisfy Conditional Expression (10):

$$-2.5<f\text{front\_}Lc/f\text{rear\_}Lc<-0.3 \quad (10).$$

When Conditional Expression (10) is satisfied, aberration sharing of the front lens unit and the rear lens unit can be appropriately performed, and various aberrations can be satisfactorily corrected.

When the upper limit of Conditional Expression (10) is not satisfied, the refractive power of the negative lens component arranged closest to the object side is increased too much, and it becomes difficult to satisfactorily correct various aberrations. When the lower limit of Conditional Expression (10) is not satisfied, the refractive power of the negative lens component arranged closest to the object side is decreased too much, and a satisfactory aberration sharing cannot be obtained unless a sufficient interval is secured between the negative lens component and a positive lens component arranged closest to the image side. Thus, it becomes difficult to downsize the converter lens.

Further, in the present invention, it is preferred that the rear lens unit include at least one positive lens satisfying Conditional Expression (11):

$$\theta gF\_n<-0.00256\times vd+0.679 \quad (11).$$

When the rear lens unit includes at least one positive lens satisfying Conditional Expression (11), overcorrection of the chromatic aberration of magnification is suitably relaxed.

When all positive lenses included in the rear lens unit do not satisfy the upper limit of Conditional Expression (11), the relative partial dispersion of the positive lens is increased too much, and the relaxation of the overcorrection of the chromatic aberration of magnification becomes insufficient. When all of the positive lenses included in the rear lens unit do not satisfy the lower limit of Conditional Expression (11), a glass material having a high refractive index is used for the positive lens, and thus it becomes difficult to correct the Petzval sum.

Further, in the present invention, when an average value of Abbe numbers of lenses having a positive refractive power included in the front lens unit and an average value of relative partial dispersions of the lenses having a positive refractive power included in the front lens unit are represented by "vfp" and "θfp", respectively, and an average value of Abbe numbers of lenses having a negative refractive power included in the front lens unit and an average value of relative partial dispersions of the lenses having a negative refractive power included in the front lens unit are represented by "vfn" and "θfn", respectively, it is desired to satisfy Conditional Expression (12):

$$-0.0085<(\theta fp-\theta fn)/(vfp-vfn)<-0.0016 \quad (12).$$

Conditional Expression (12) defines a relationship of dispersion and relative partial dispersion of the positive lens and the negative lens in the front lens unit to define a condition for more satisfactorily correcting the secondary spectrum of the chromatic aberration of magnification.

When the upper limit of Conditional Expression (12) is not satisfied, the secondary spectrum is overcorrected at the front lens unit, and it becomes difficult to satisfactorily correct the secondary spectrum of the chromatic aberration of magnification. When the lower limit of Conditional Expression (12) is not satisfied, strong refractive powers are given to the positive lens and the negative lens in order to correct the secondary spectrum, and hence it becomes difficult to satisfactorily correct various aberrations.

Further, in the present invention, it is preferred that a lens surface closest to the image side in the lenses having a refractive power be convex toward the image side.

When the lens surface closest to the image side is convex toward the image side, an astigmatism and a distortion can be satisfactorily corrected.

Further, in the present invention, it is preferred that the converter lens optical system include at least three lenses having a positive refractive power and at least three lenses having a negative refractive power.

It is more preferred that numerical ranges of Conditional Expressions (1), (2), and (4) to (12) be set as follows.

$$1.5<L/x<3.2 \quad (1a)$$

$$3.0<L/y<7.5 \quad (2a)$$

$$\theta gF\_n>-0.00162\times vd+0.662 \quad (4a)$$

$$-2.0<f\_neg/f\_conv<0.5 \quad (5a)$$

$$2.2<\beta<2.9 \quad (6a)$$

$$-0.0066<(\theta rp-\theta rn)/(vrp-vrn)<-0.0030 \quad (7a)$$

$$1.80<Nn\_ave<2.00 \quad (8a)$$

$$1.5<L/f\text{rear\_}Lc<3.0 \quad (9a)$$

$$-2.0<f\text{front\_}Lc/f\text{rear\_}Lc<-0.5 \quad (10a)$$

$$\theta gF\_n<-0.00256\times vd+0.677 \quad (11a)$$

$$-0.0075<(\theta fp-\theta fn)/(vfp-vfn)<-0.0020 \quad (12a)$$

Now, a specific configuration of the image pickup apparatus according to one embodiment of the present invention is described by way of features of the optical system of Numerical Embodiment 1 corresponding to Embodiment 1.

Figure 4:
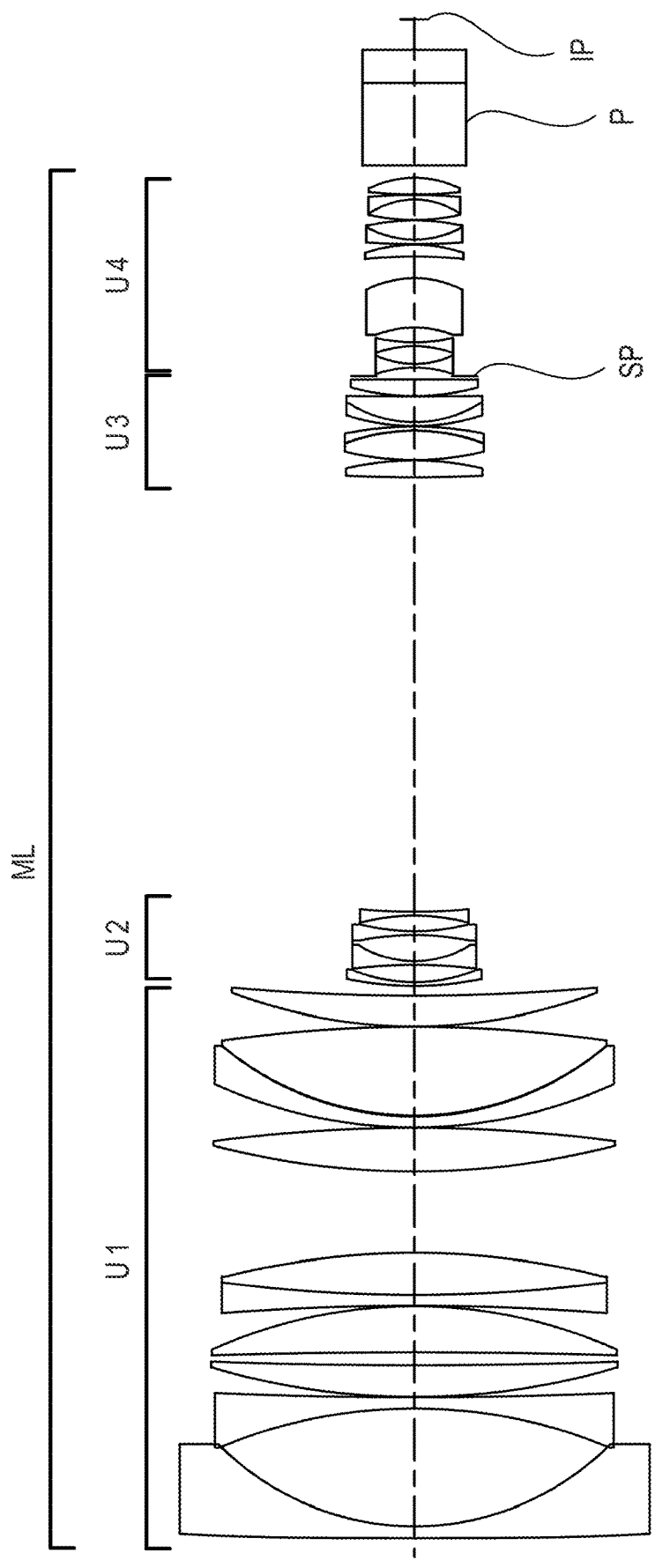
FIG. 4 is a cross-sectional view of the interchangeable lens when focused at infinity at the wide angle end.
Figure 5:
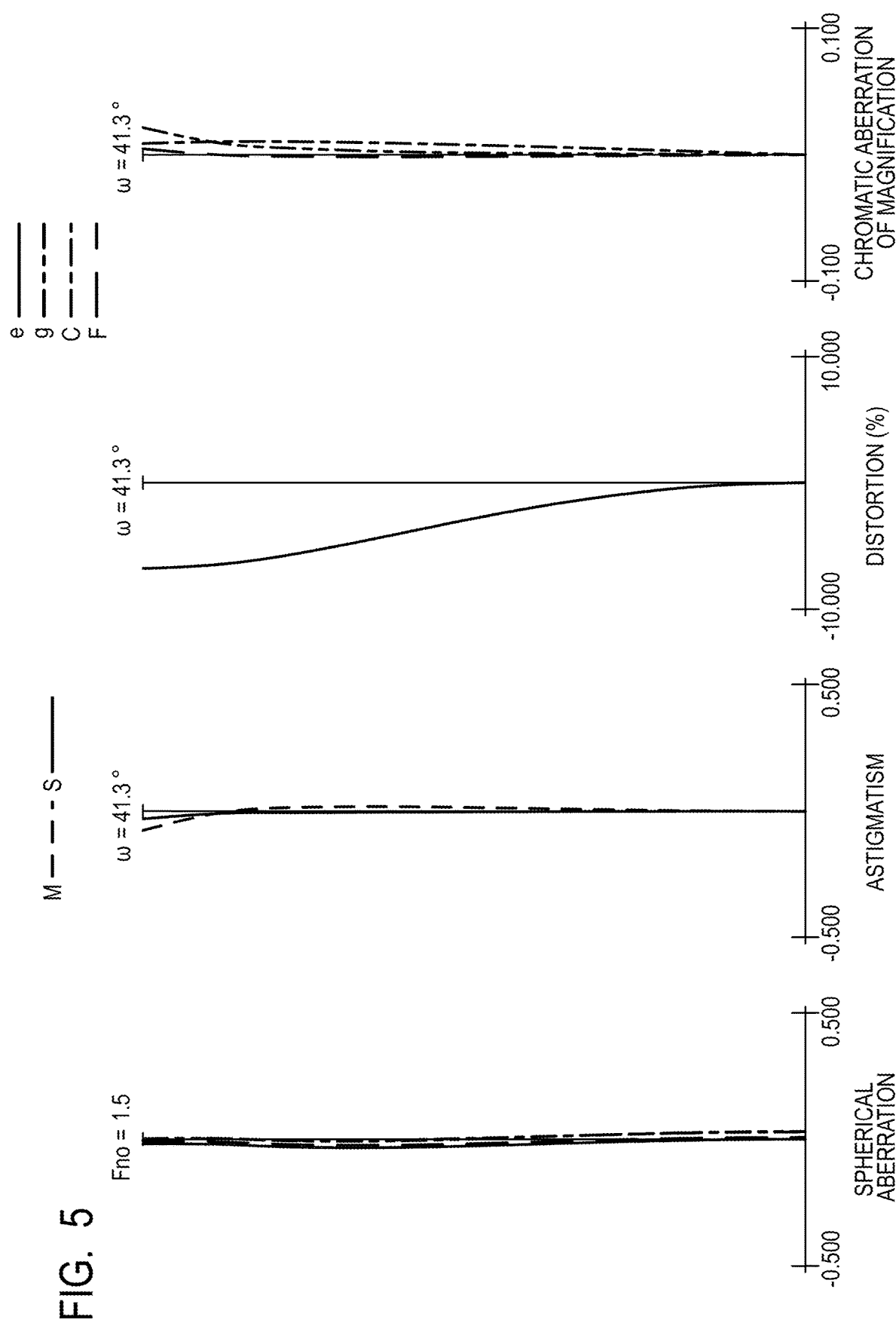
FIG. 5 is longitudinal aberration diagrams of the interchangeable lens when focused at infinity at the wide angle end.

FIG. 4 is a lens cross-sectional view of the interchangeable lens, which serves as an example to which the converter lens according to each Embodiment of the present invention is mounted, at the time when the focus is at infinity at the wide angle end. FIG. 5 is longitudinal aberration diagrams of the interchangeable lens at the time when the focus is at infinity at the wide angle end. In addition, the value of the focal length is a value when a corresponding value in Numerical Embodiment 1 to be described later is represented in units of mm. This also applies to Numerical Embodiments described below.

In FIG. 4, the interchangeable lens optical system ML includes, in order from an object side to an image side, a first lens unit (focus lens unit) U1 having a positive refractive power for focusing, and a second lens unit (variator) U2 having a negative refractive power for magnification varying, which is configured to move toward the image side during magnification varying from the wide angle end to the telephoto end. The interchangeable lens optical system ML further includes a third lens unit (compensator) U3 having a positive refractive power, which is configured to non-linearly move on the optical axis in conjunction with the movement of the second lens unit U2 to correct an image plane variation accompanying the magnification varying. The interchangeable lens optical system ML further includes a fourth lens unit (relay lens unit) U4 having a positive refractive power, which is configured to perform an image forming action and configured not to move for magnification varying. The second lens unit U2 and the third lens unit U3 construct a magnification varying system. An aperture stop SP is arranged on the object side of the fourth lens unit U4. A glass block P is a color separation optical system or an optical filter. An image pickup plane IP corresponds to an image pickup surface of a solid-state image pickup element.

In each of the longitudinal aberration diagrams, spherical aberrations are illustrated with respect to an e-line, the g-line, the C-line, and the F-line by a solid line, a two-dot chain line, a one-dot chain line, and a broken line, respectively. Further, astigmatisms are illustrated on a meridional image plane by a broken line and on a sagittal image plane by a solid line. In addition, chromatic aberrations of magnification are illustrated with respect to the g-line, the C-line, and the F-line by a two-dot chain line, a one-dot chain line, and a broken line, respectively. A half angle of view is denoted by "ω" and an f-number is denoted by Fno. In each of the longitudinal aberration diagrams, a spherical aberration is illustrated in the unit of 0.5 mm, an astigmatism in the unit of 0.5 mm, a distortion in the unit of 10%, and a chromatic aberration of magnification in the unit of 0.01 mm.

Figure 6:
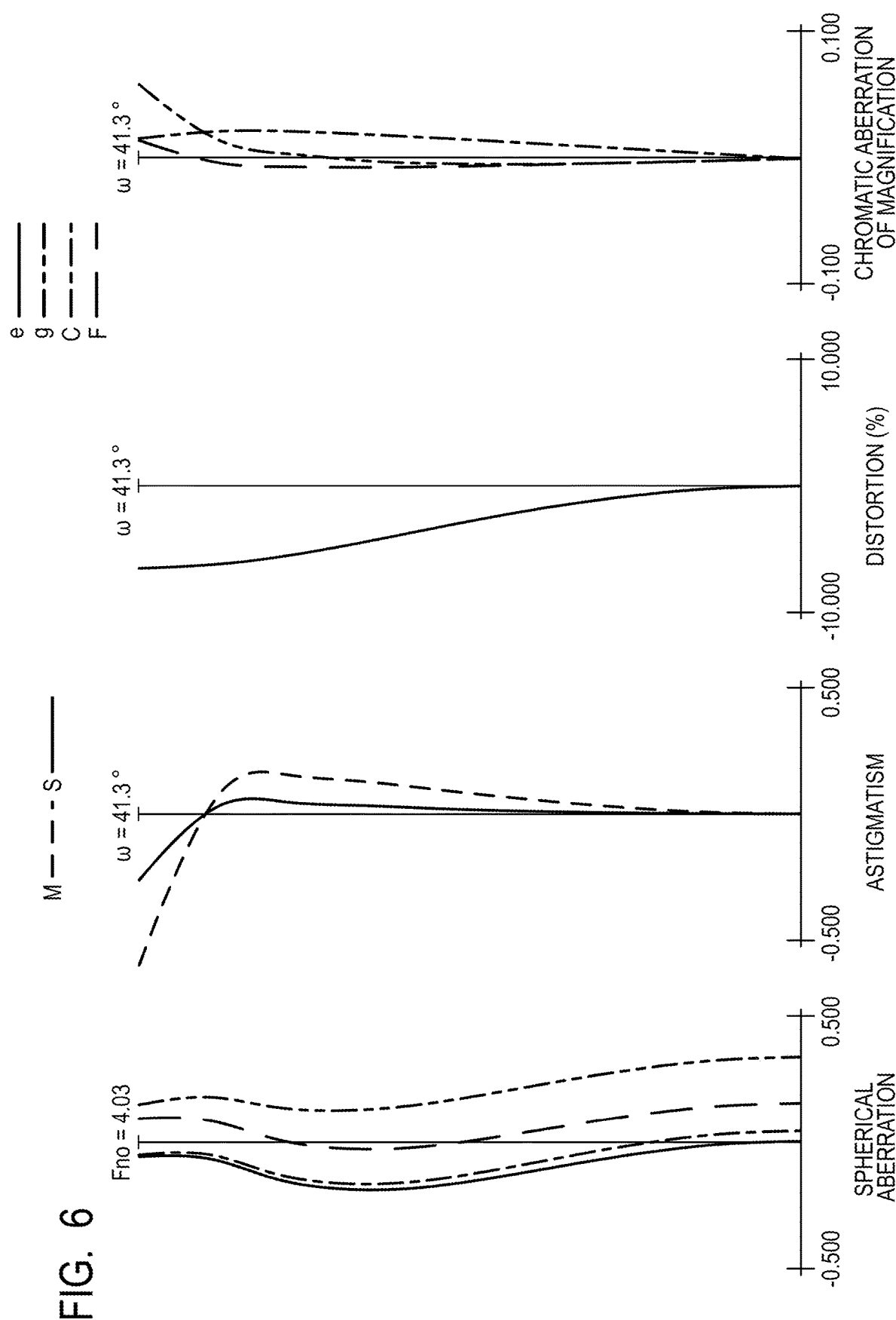
FIG. 6 is longitudinal aberration diagrams at the time when the interchangeable lens is focused at infinity at the wide angle end under the state in which the converter lens according to Embodiment 1 is mounted to the interchangeable lens.

FIG. 6 is longitudinal aberration diagrams at the time when the interchangeable lens is focused at infinity at the wide angle end under a state in which the converter lens according to Embodiment 1 is mounted to the interchangeable lens. The converter lens according to Embodiment 1 is arranged so that the first surface is located at a position shifted to the image side by 17.47 mm from the fifty-fifth surface, which is a surface closest to the image side of the interchangeable lens.

Next, an optical system in Embodiment 1 is described. In the following description, a lens included in the converter lens is represented by Gi in accordance with the order "i" counted from the object side. Further, each single lens forming the cemented lens is applied with an individual symbol. The optical system includes, in order from the object side, a negative meniscus lens G1, which is convex toward the object side, a cemented lens of a biconvex lens G2 and a biconcave lens G3, a cemented lens of a biconcave lens G4 and a positive meniscus lens G5, which is convex toward the object side, a cemented lens of a biconvex lens G6 and a biconcave lens G7, and a cemented lens of a negative meniscus lens G8, which is convex toward the object side, and a biconvex lens G9. In Embodiment 1, the front lens unit corresponds to the lenses G1 to G5, and the rear lens unit corresponds to the lenses G6 to G9. When the converter lens according to Embodiment 1 is mounted to the interchangeable lens, the image circle of the interchangeable lens is enlarged by 2.69 times.

Values corresponding to respective conditional expressions of Embodiment 1 are shown in Table 1. Embodiment 1 satisfies Conditional Expressions (1) to (12), and achieves a downsized converter lens that satisfactorily corrects various aberrations, in particular, a chromatic aberration of magnification.

Embodiment 2

Figure 7:
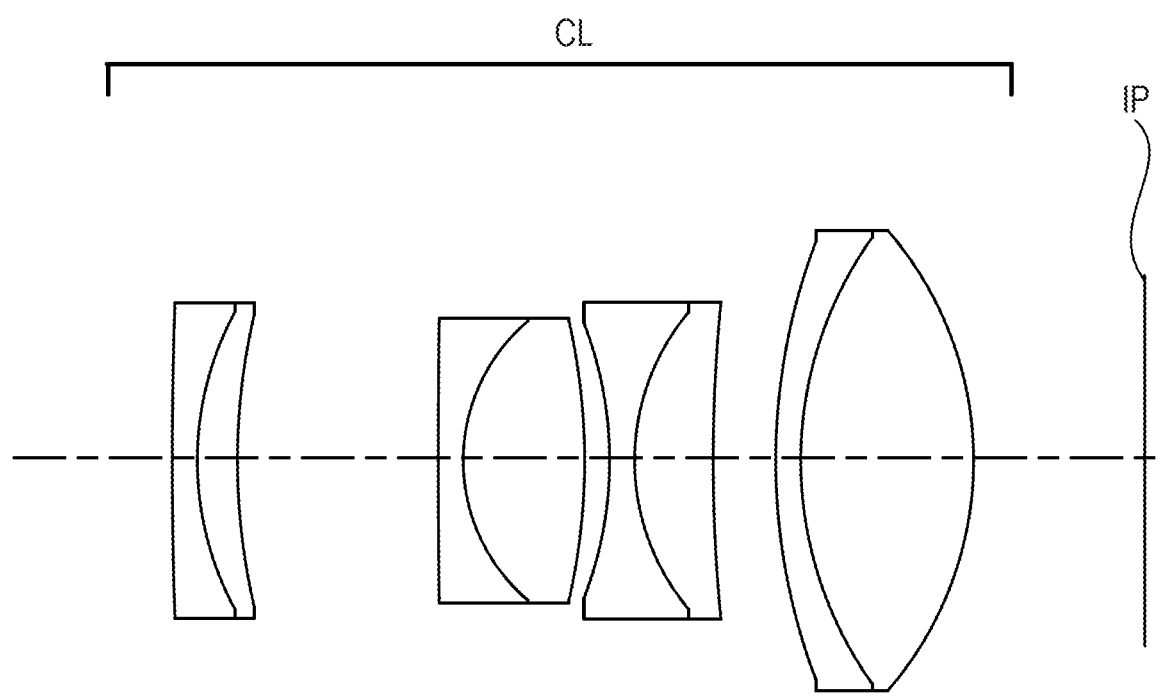
FIG. 7 is a lens cross-sectional view of a converter lens according to Embodiment 2 of the present invention.
Figure 8:
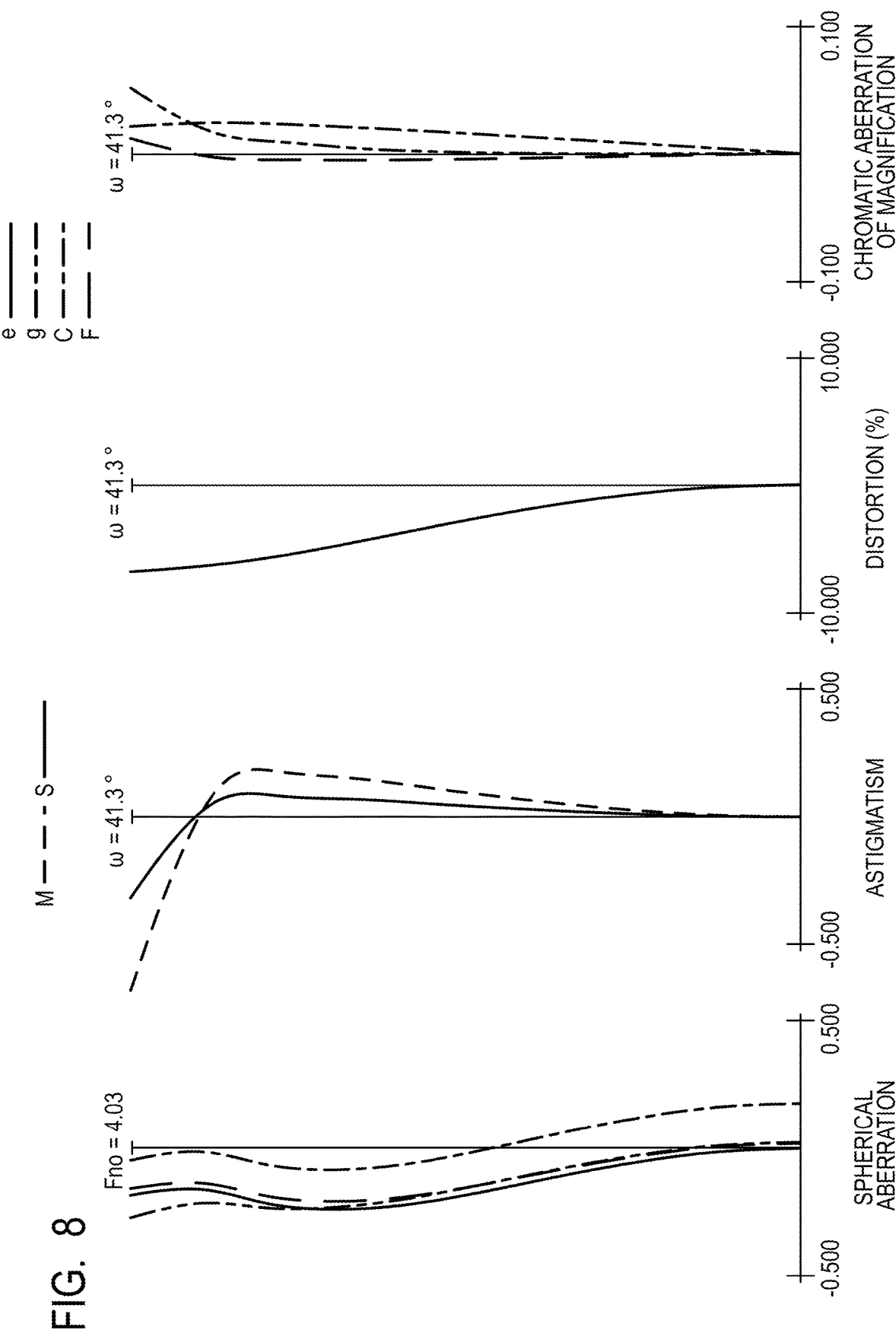
FIG. 8 is longitudinal aberration diagrams at the time when an interchangeable lens is focused at infinity at a wide angle end under a state in which the converter lens according to Embodiment 2 is mounted to the interchangeable lens.

FIG. 7 is a lens cross-sectional view of a converter lens according to Embodiment 2 of the present invention. In FIG. 7, there is illustrated a converter lens CL. Further, the image pickup plane IP corresponds to the image pickup surface of the solid-state image pickup element. FIG. 8 is longitudinal aberration diagrams at the time when the interchangeable lens is focused at infinity at the wide angle end under a state in which the converter lens according to Embodiment 2 is mounted to the interchangeable lens. The converter lens according to Embodiment 2 is arranged so that the first surface is located at a position shifted to the image side by 20.52 mm from the fifty-fifth surface, which is a surface closest to the image side of the interchangeable lens.

Next, an optical system in Embodiment 2 is described. The optical system includes, in order from the object side, a cemented lens of a negative meniscus lens G1, which is convex toward the object side, and a positive meniscus lens G2, which is convex toward the object side, a cemented lens of a negative meniscus lens G3, which is convex toward the object side, and a biconvex lens G4, a cemented lens of a biconcave lens G5 and a positive meniscus lens G6, which is convex toward the object side, and a cemented lens of a negative meniscus lens G7, which is convex toward the object side, and a biconvex lens G8. In Embodiment 2, the front lens unit corresponds to the lenses G1 to G4, and the rear lens unit corresponds to the lenses G5 to G8. When the converter lens according to Embodiment 2 is mounted to the interchangeable lens, the image circle of the interchangeable lens is enlarged by 2.69 times.

Values corresponding to respective conditional expressions of Embodiment 2 are shown in Table 1. Embodiment 2 satisfies Conditional Expressions (1) to (12), and achieves a downsized converter lens that satisfactorily corrects various aberrations, in particular, a chromatic aberration of magnification.

Embodiment 3

Figure 9:
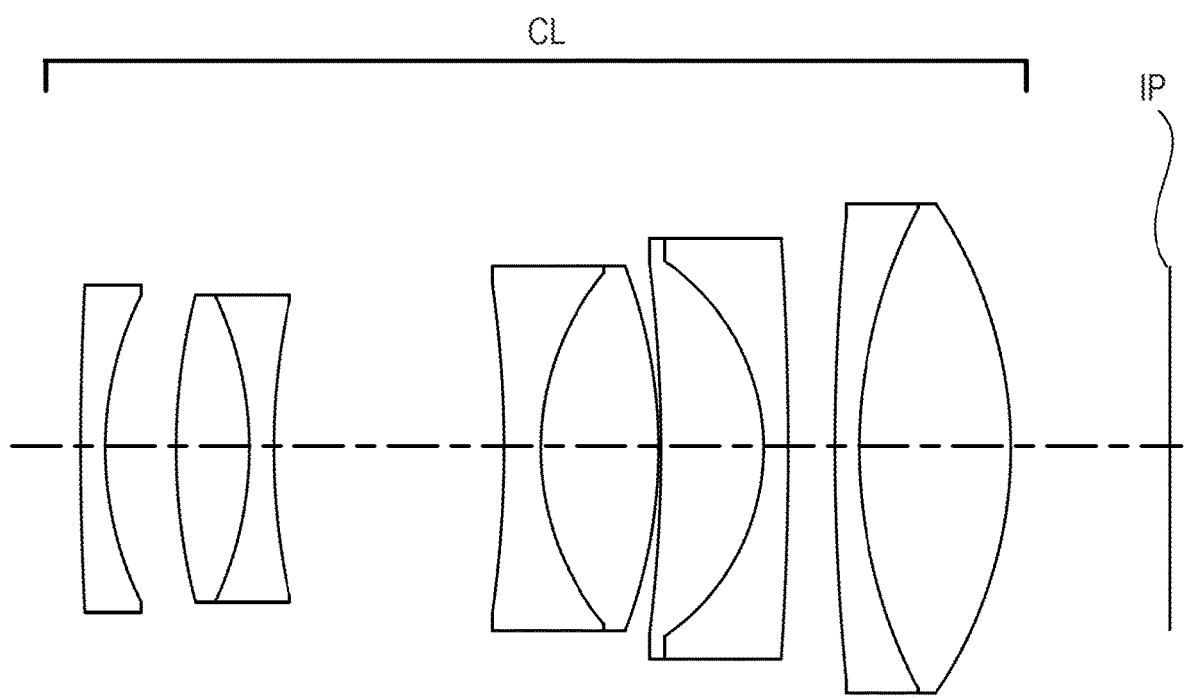
FIG. 9 is a lens cross-sectional view of a converter lens according to Embodiment 3 of the present invention.
Figure 10:
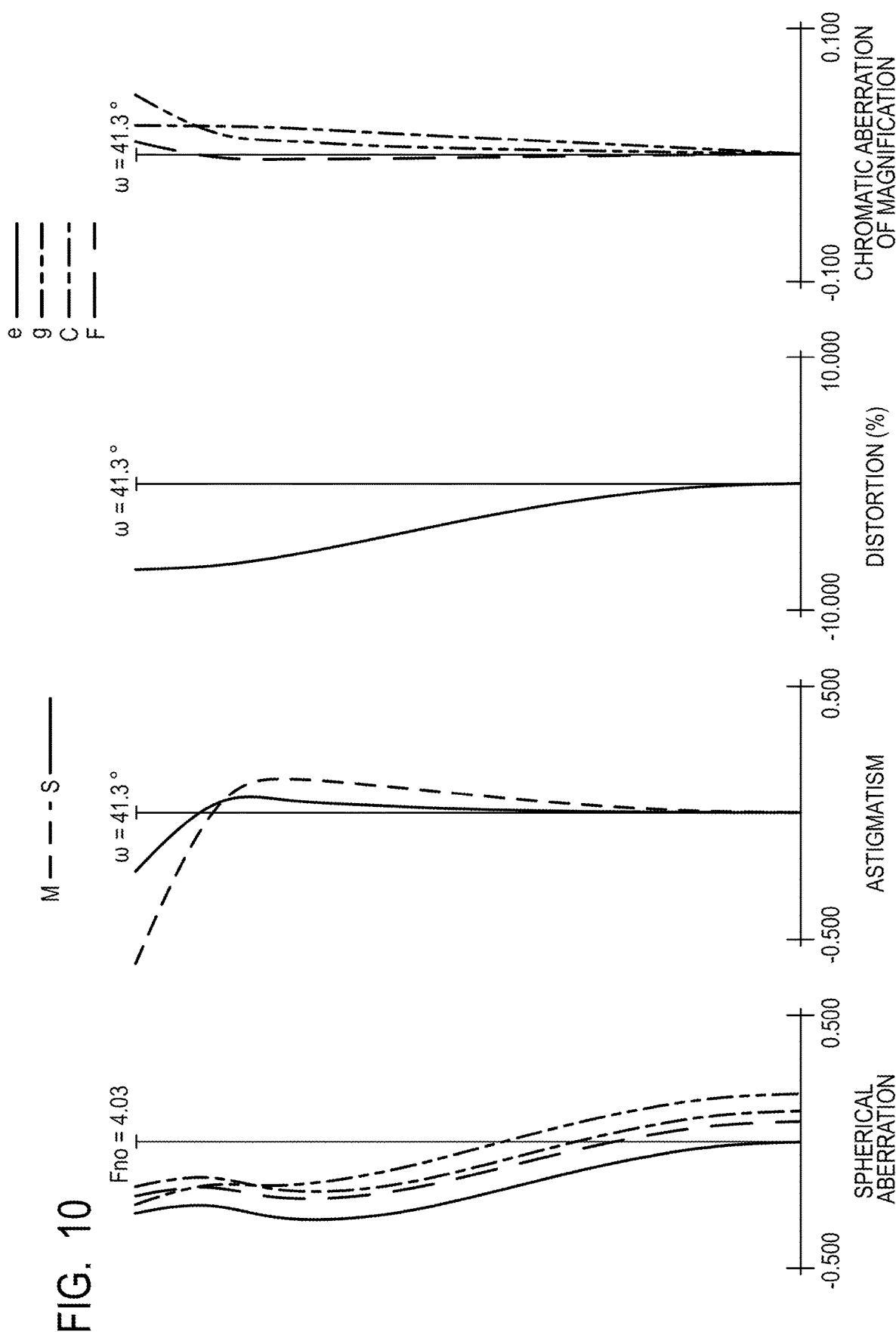
FIG. 10 is longitudinal aberration diagrams at the time when an interchangeable lens is focused at infinity at a wide angle end under a state in which the converter lens according to Embodiment 3 is mounted to the interchangeable lens.

FIG. 9 is a lens cross-sectional view of a converter lens according to Embodiment 3 of the present invention. In FIG. 9, there is illustrated a converter lens CL. Further, the image pickup plane IP corresponds to the image pickup surface of the solid-state image pickup element. FIG. 10 is longitudinal aberration diagrams at the time when the interchangeable lens is focused at infinity at the wide angle end under a state in which the converter lens according to Embodiment 3 is mounted to the interchangeable lens. The converter lens according to Embodiment 3 is arranged so that the first surface is located at a position shifted to the image side by 21.08 mm from the fifty-fifth surface, which is a surface closest to the image side of the interchangeable lens.

Next, an optical system in Embodiment 3 is described. The optical system includes, in order from the object side, a negative meniscus lens G1, which is convex toward the object side, a cemented lens of a biconvex lens G2 and a biconcave lens G3, a cemented lens of a biconcave lens G4 and a biconvex lens G5, a cemented lens of a positive meniscus lens G6, which is concave toward the object side, and a negative meniscus lens G7, which is concave toward the object side, and a cemented lens of a negative meniscus lens G8, which is convex toward the object side, and a biconvex lens G9. In Embodiment 3, the front lens unit corresponds to the lenses G1 to G5, and the rear lens unit corresponds to the lenses G6 to G9. When the converter lens according to Embodiment 3 is mounted to the interchangeable lens, the image circle of the interchangeable lens is enlarged by 2.69 times.

Values corresponding to respective conditional expressions of Embodiment 3 are shown in Table 1. Embodiment 3 satisfies Conditional Expressions (1) to (12), and achieves a downsized converter lens that satisfactorily corrects various aberrations, in particular, a chromatic aberration of magnification.

Embodiment 4

Figure 11:
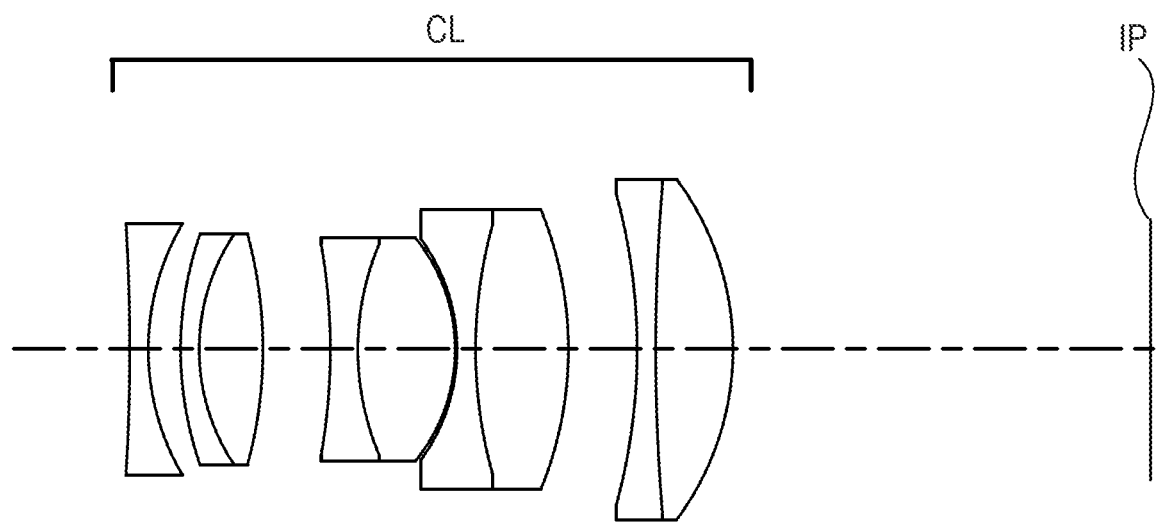
FIG. 11 is a lens cross-sectional view of a converter lens according to Embodiment 4 of the present invention.

FIG. 11 is a lens cross-sectional view of a converter lens according to Embodiment 4 of the present invention. In FIG.

Figure 12:
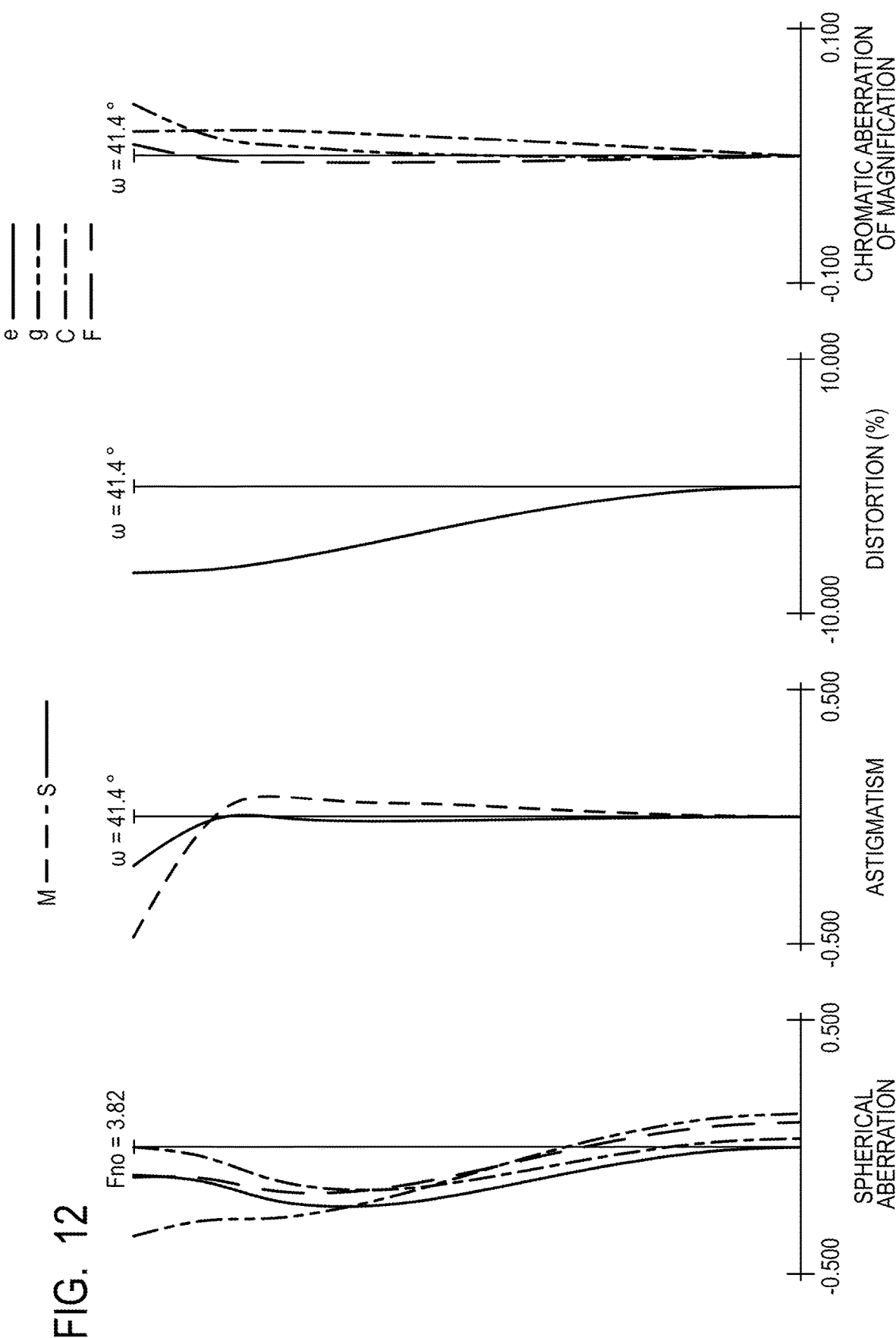
FIG. 12 is longitudinal aberration diagrams at the time when an interchangeable lens is focused at infinity at a wide angle end under a state in which the converter lens according to Embodiment 4 is mounted to the interchangeable lens.

11, there is illustrated a converter lens CL. Further, the image pickup plane IP corresponds to the image pickup surface of the solid-state image pickup element. FIG. 12 is longitudinal aberration diagrams at the time when the interchangeable lens is focused at infinity at the wide angle end under a state in which the converter lens according to Embodiment 4 is mounted to the interchangeable lens. The convener lens according to Embodiment 4 is arranged so that the first surface is located at a position shifted to the image side by 16.80 mm from the fifty-fifth surface, which is a surface closest to the image side of the interchangeable lens.

Next, an optical system in Embodiment 4 is described. The optical system includes a biconcave lens G1, a cemented lens of a negative meniscus lens G2, which is convex toward the object side, and a biconvex lens G3, a cemented lens of a biconcave lens G4 and a biconvex lens G5, a cemented lens of a biconcave lens G6 and a biconvex lens G7, and a cemented lens of a biconcave lens G8 and a biconvex lens G9. In Embodiment 4, the front lens unit corresponds to the lenses G1 to G5, and the rear lens unit corresponds to the lenses G6 to G9. When the converter lens according to Embodiment 4 is mounted to the interchangeable lens, the image circle of the interchangeable lens is enlarged by 2.55 times.

Values corresponding to respective conditional expressions of Embodiment 4 are shown in Table 1. Embodiment 4 satisfies Conditional Expressions (1) to (12), and achieves a downsized converter lens that satisfactorily corrects various aberrations, in particular, a chromatic aberration of magnification.

Embodiment 5

Figure 13:
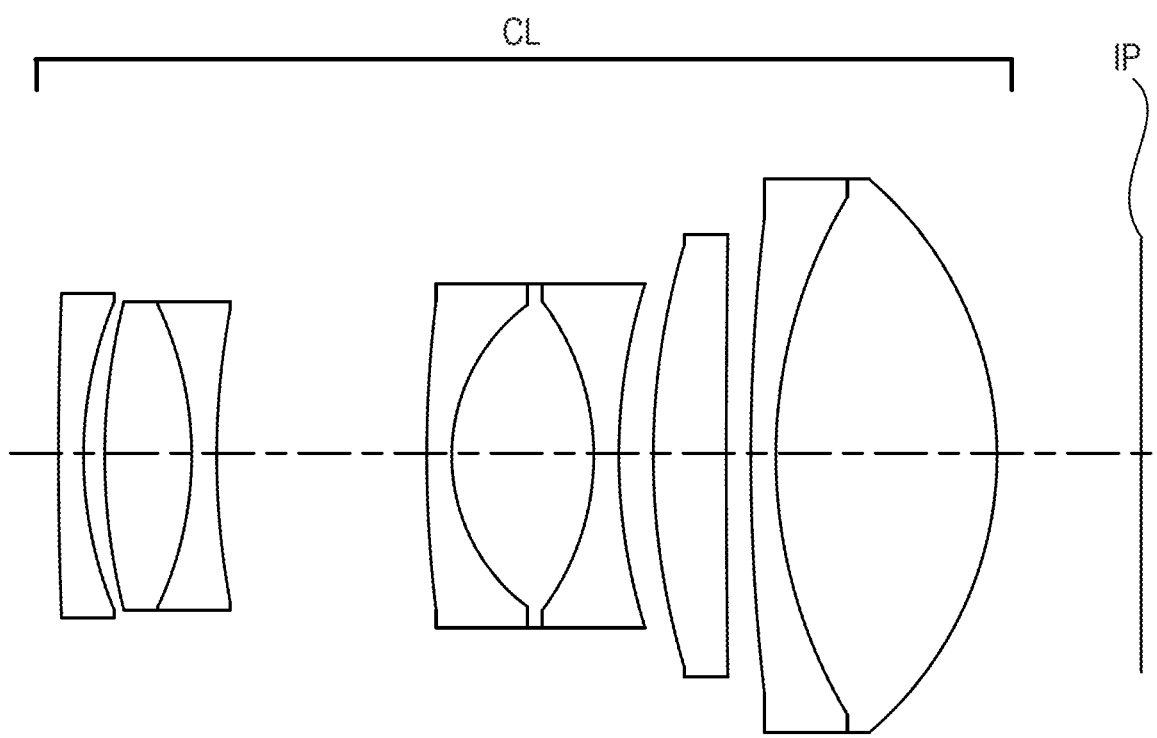
FIG. 13 is a lens cross-sectional view of a convener lens according to Embodiment 5 of the present invention.
Figure 14:
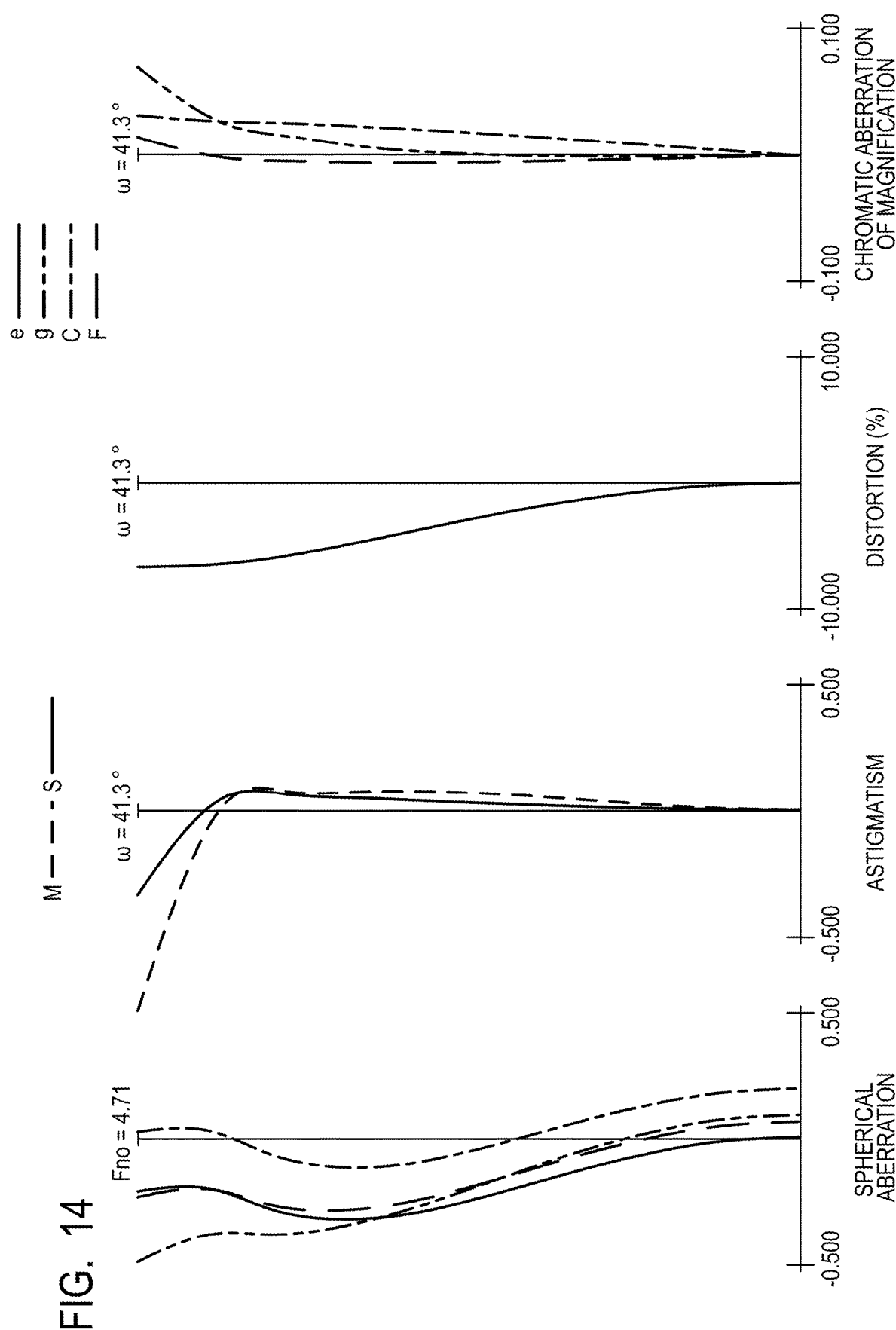
FIG. 14 is longitudinal aberration diagrams at the time when an interchangeable lens is focused at infinity at a wide angle end under a state in which the converter lens according to Embodiment 5 is mounted to the interchangeable lens.

FIG. 13 is a lens cross-sectional view of a converter lens according to Embodiment 5 of the present invention. In FIG. 13, there is illustrated a converter lens CL. Further, the image pickup plane IP corresponds to the image pickup surface of the solid-state image pickup element. FIG. 14 is longitudinal aberration diagrams at the time when the interchangeable lens is focused at infinity at the wide angle end under a state in which the converter lens according to Embodiment 5 is mounted to the interchangeable lens. The converter lens according to Embodiment 5 is arranged so that the first surface is located at a position shifted to the image side by 22.39 mm from the fifty-fifth surface, which is a surface closest to the image side of the interchangeable lens.

Next, an optical system in Embodiment 5 is described. The optical system includes a negative meniscus lens G1, which is convex toward the object side, a cemented lens of a biconvex lens G2 and a biconcave lens G3, a cemented lens of a negative meniscus lens G4, which is convex toward the object side, a biconcave lens G5, and a biconvex lens G6, a biconvex lens G7, and a cemented lens of a negative meniscus lens G8, which is convex toward the object side, and a biconvex lens G9. In Embodiment 5, the front lens unit corresponds to the lenses G1 to G5, and the rear lens unit corresponds to the lenses G6 to G9. When the converter lens according to Embodiment 5 is mounted to the interchangeable lens, the image circle of the interchangeable lens is enlarged by 3.15 times.

Values corresponding to respective conditional expressions of Embodiment 5 are shown in Table 1. Embodiment 5 satisfies Conditional Expressions (1) to (12), and achieves a downsized converter lens that satisfactorily corrects various aberrations, in particular, a chromatic aberration of magnification.

Embodiment 6

Figure 15:
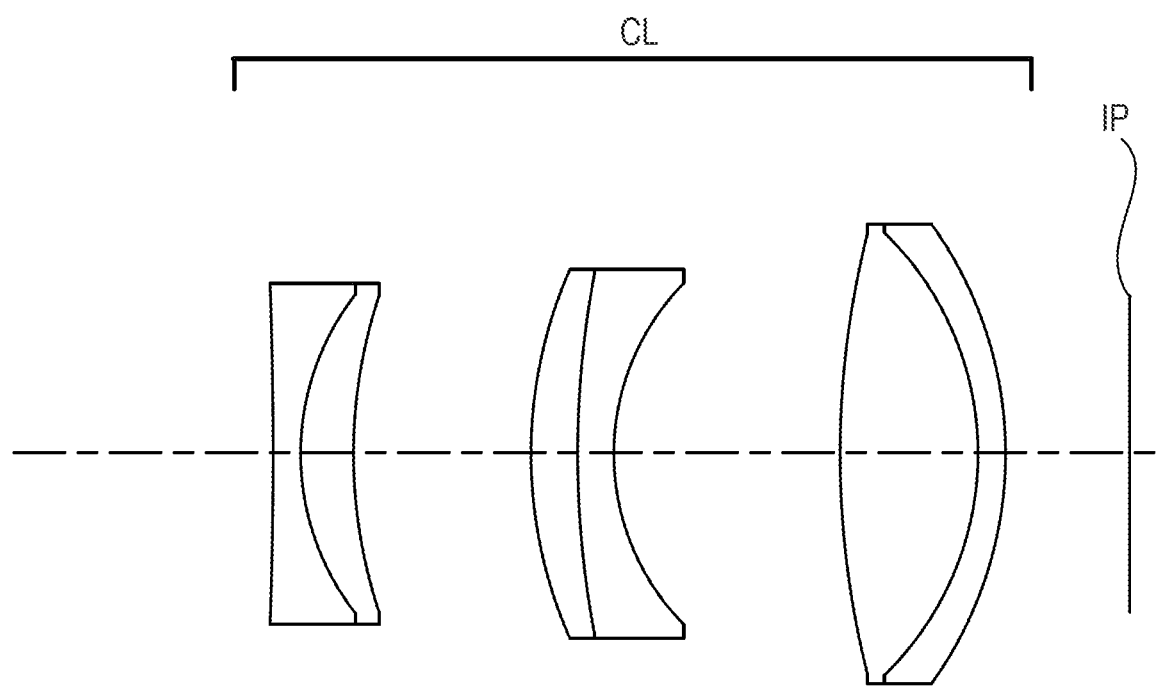
FIG. 15 is a lens cross-sectional view of a converter lens according to Embodiment 6 of the present invention.
Figure 16:
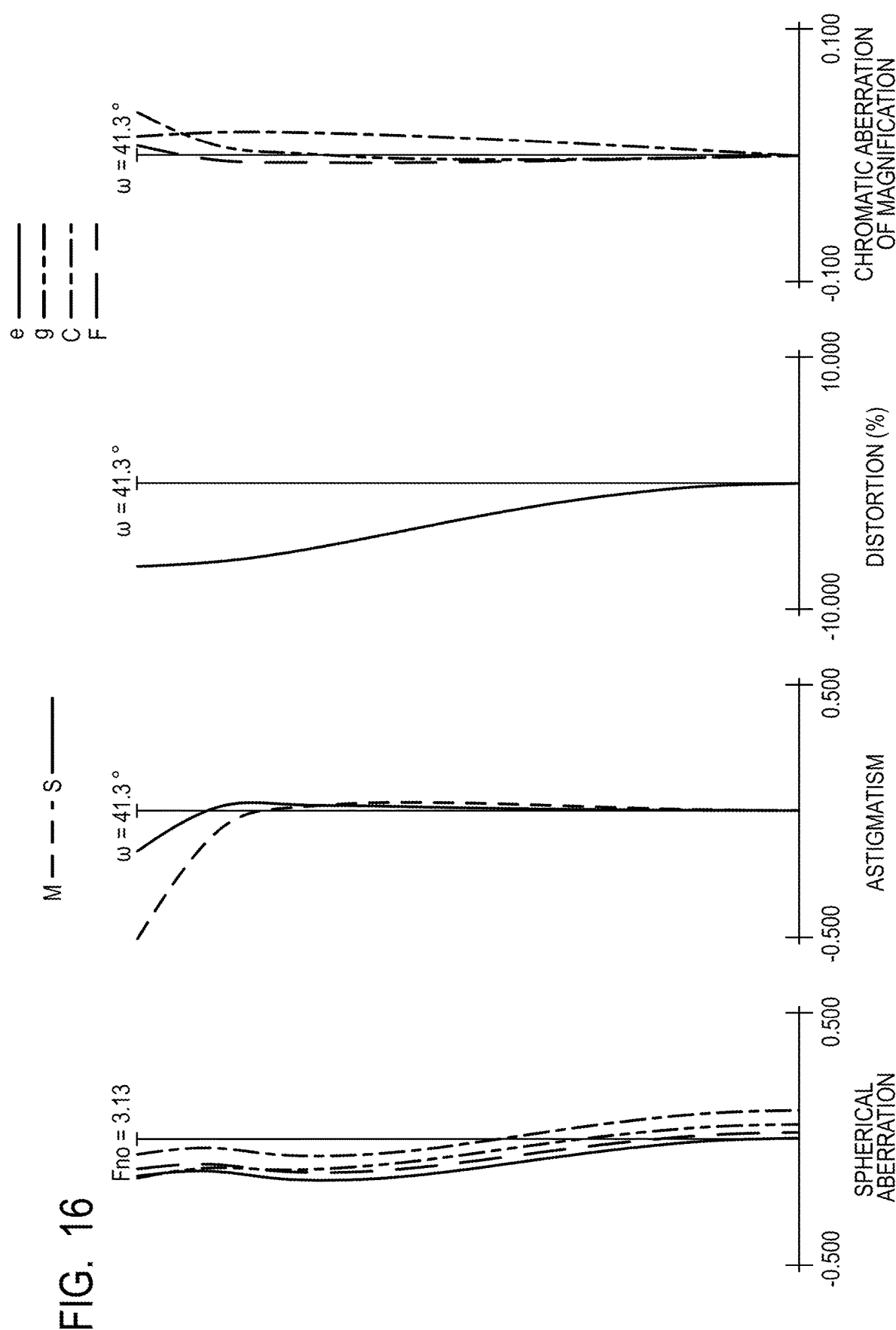
FIG. 16 is longitudinal aberration diagrams at the time when an interchangeable lens is focused at infinity at a wide angle end under a state in which the converter lens according to Embodiment 6 is mounted to the interchangeable lens.

FIG. 15 is a lens cross-sectional view of a converter lens according to Embodiment 6 of the present invention. In FIG. 15, there is illustrated a converter lens CL. Further, the image pickup plane IP corresponds to the image pickup surface of the solid-state image pickup element. FIG. 16 is longitudinal aberration diagrams at the time when the interchangeable lens is focused at infinity at the wide angle end under a state in which the converter lens according to Embodiment 6 is mounted to the interchangeable lens. The converter lens according to Embodiment 6 is arranged so that the first surface is located at a position shifted to the image side by 24.79 mm from the fifty-fifth surface, which is a surface closest to the image side of the interchangeable lens.

Next, an optical system in Embodiment 6 is described. The optical system includes a cemented lens of a biconcave lens G1 and a positive meniscus lens G2, which is convex toward the object side, a cemented lens of a positive meniscus lens G3, which is convex toward the object side, and a negative meniscus lens G4, which is convex toward the object side, and a cemented lens of a biconvex lens G5 and a negative meniscus lens G6, which is convex toward the image side. In Embodiment 6, the front lens unit corresponds to the lenses G1 to G4, and the rear lens unit corresponds to the lenses G5 to G6. When the converter lens according to Embodiment 1 is mounted to the interchangeable lens, the image circle of the interchangeable lens is enlarged by 2.09 times.

Values corresponding to respective conditional expressions of Embodiment 6 are shown in Table 1. Embodiment 6 satisfies Conditional Expressions (1) to (12), and achieves a downsized converter lens that satisfactorily corrects various aberrations, in particular, a chromatic aberration of magnification.

Embodiment 7

Figure 17:
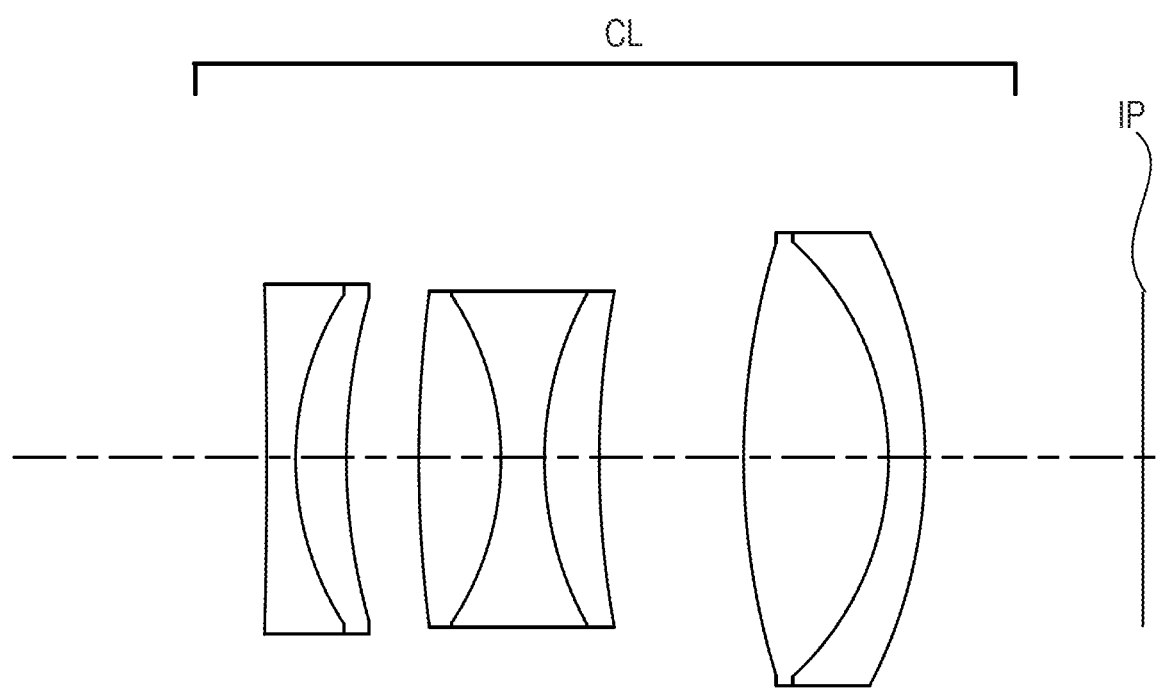
FIG. 17 is a lens cross-sectional view of a convener lens according to Embodiment 7 of the present invention.
Figure 18:
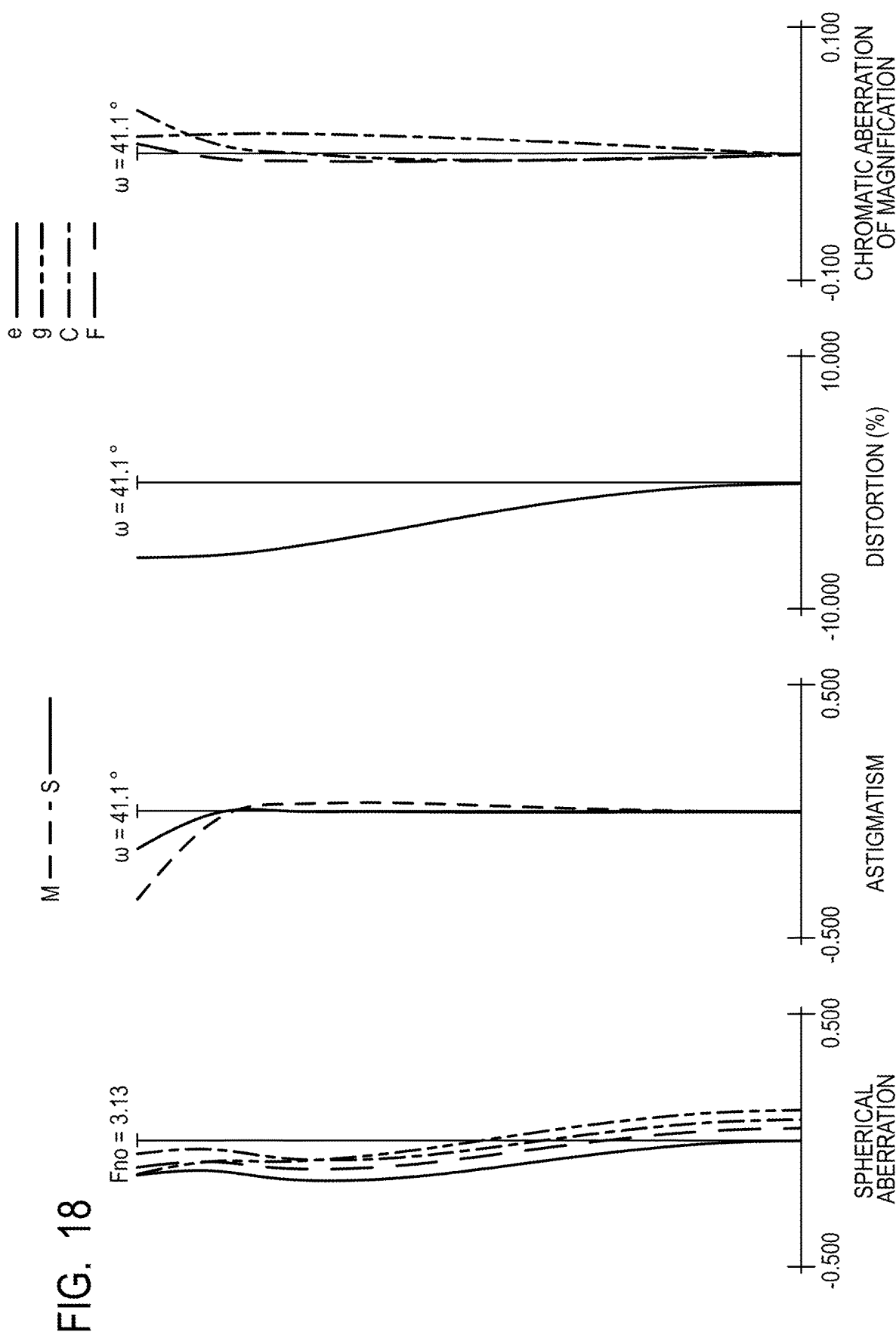
FIG. 18 is longitudinal aberration diagrams at the time when an interchangeable lens is focused at infinity at a wide angle end under a state in which the converter lens according to Embodiment 7 is mounted to the interchangeable lens.

FIG. 17 is a lens cross-sectional view of a converter lens according to Embodiment 7 of the present invention. In FIG. 17, there is illustrated a converter lens CL. Further, the image pickup plane IP corresponds to the image pickup surface of the solid-state image pickup element. FIG. 18 is longitudinal aberration diagrams at the time when the interchangeable lens is focused at infinity at the wide angle end under a state in which the converter lens according to Embodiment 7 is mounted to the interchangeable lens. The converter lens according to Embodiment 7 is arranged so that the first surface is located at a position shifted to the image side by 25.75 mm from the fifty-fifth surface, which is a surface closest to the image side of the interchangeable lens.

Next, an optical system in Embodiment 7 is described. The optical system includes a cemented lens of a biconvex lens G1 and a positive meniscus lens G2, which is convex toward the object side, a cemented lens of a biconvex lens G3, a biconcave lens G4, and a positive meniscus lens G5, which is convex toward the object side, and a cemented lens of a biconvex lens G6 and a negative meniscus lens G7, which is convex toward the image side. In Embodiment 7, the front lens unit corresponds to the lenses G1 to G5, and the rear lens unit corresponds to the lenses G6 to G7. When the converter lens according to Embodiment 7 is mounted to the interchangeable lens, the image circle of the interchangeable lens is enlarged by 2.09 times.

Values corresponding to respective conditional expressions of Embodiment 7 are shown in Table 1. Embodiment 7 satisfies Conditional Expressions (1) to (12), and achieves a downsized converter lens that satisfactorily corrects various aberrations, in particular, a chromatic aberration of magnification.

Figure 20:
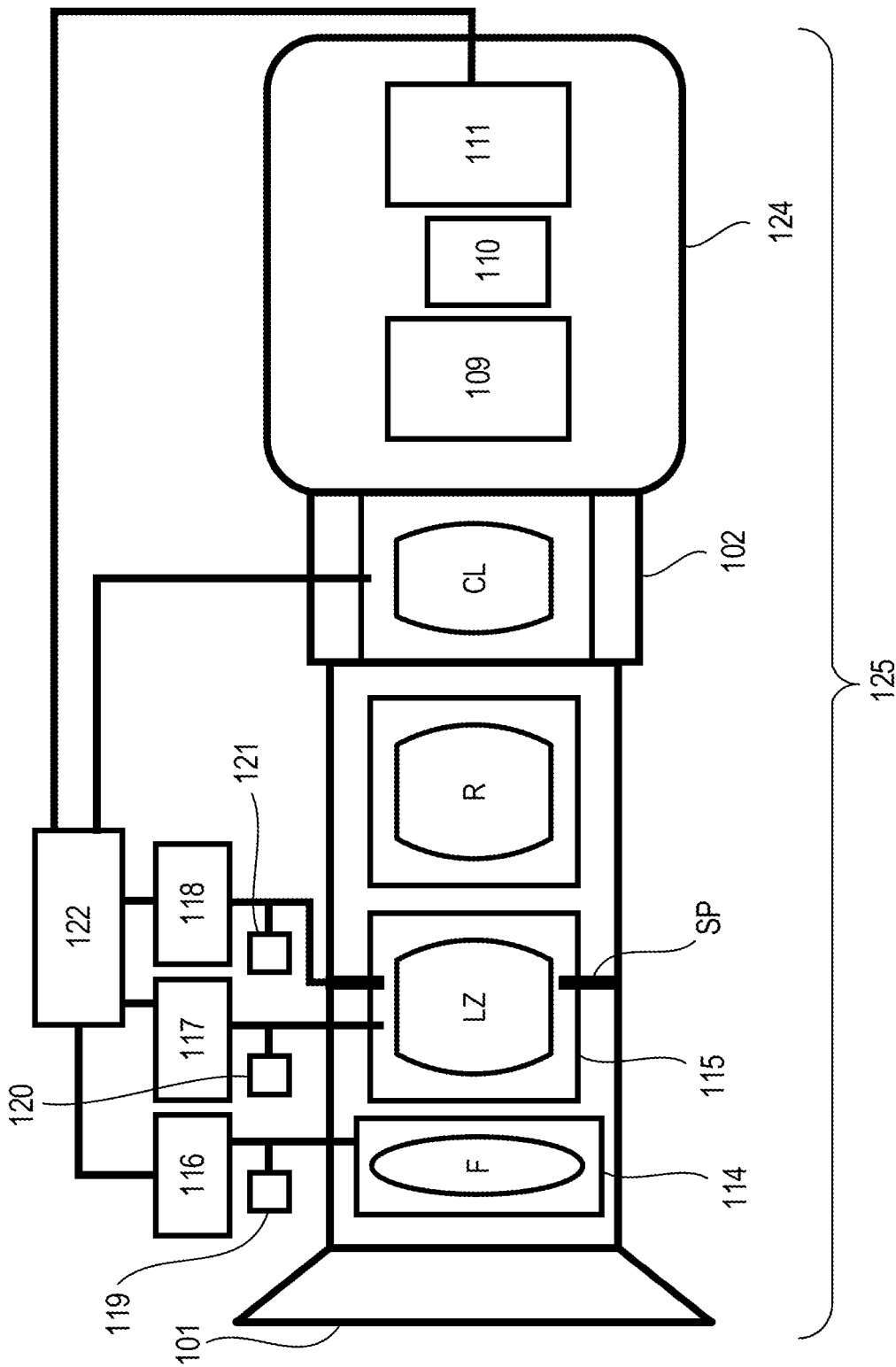
FIG. 20 is a schematic diagram of a main part of an image pickup apparatus according to one embodiment of the present invention.

FIG. 20 is a schematic diagram of a main part of an image pickup apparatus serving as one embodiment of the present invention. In FIG. 20, there is illustrated a converter lens 102 according to any one of Embodiments 1 to 7. There are further illustrated a master lens optical system 101 and a camera (camera apparatus) 124. The converter lens 102 is removably mounted to the camera 124, and the master lens optical system 101 is removably mounted to the converter lens 102. An image pickup apparatus 125 is formed by mounting the converter lens 102 and the master lens optical system 101 to the camera 124.

The master lens optical system 101 includes a first lens unit F, a magnification varying portion LZ, and a final lens unit R for image formation.

The magnification varying portion LZ includes a lens unit configured to move on the optical axis for magnification varying. An aperture stop is denoted by SP. Drive mechanisms 114 and 115, such as helicoids or cams, are configured to drive the first lens unit F and the magnification varying portion LZ in the optical axis direction, respectively.

Motors (drive units) 116 to 118 are configured to electrically drive the drive mechanisms 114 and 115 and the aperture stop SP, respectively. Detectors 119 to 121, such as encoders, potentiometers, or photosensors, are configured to detect positions of the first lens unit F and the magnification varying portion LZ on the optical axis, and an aperture diameter of the aperture stop SP, respectively. In the camera 124, a Mass block 109 corresponds to an optical filter in the camera 124. A solid-state image pickup element (photoelectric conversion element) 110, for example, a CCD sensor or a CMOS sensor, is configured to receive an object image formed by the master lens optical system 101 and the converter lens 102.

Further, CPUs 111 and 122 are configured to control various kinds of driving of the camera 124, the converter lens 102, and the master lens optical system 101. An image pickup apparatus having high optical performance is realized by applying the converter lens according to one embodiment of the present invention to a camera as described above. Numerical Embodiments corresponding to Embodiments of the present invention are shown below. In each Numerical Embodiment, "i" represents the order of the surface from the object side, "ri" represents a curvature of radius of the i-th surface, "di" represents an interval between the i-th surface and the (i+1)-th surface, and "ndi" and "vdi" represent a refractive index and an Abbe number, respectively, of an optical member present between the i-th surface and the (i+1)-th surface. BF represents an air-equivalent back focus. The last three surfaces are a glass block such as a filter.

When an X axis is set in the optical axis direction, an H axis is set in a direction perpendicular to the optical axis, a direction of travel of light is defined as positive, a paraxial curvature radius is represented by R, a conic constant is represented by k, and aspherical coefficients are represented by A4, A6, A8, and A10, the aspherical shape is expressed by the expression below. Moreover, "e-Z" means "×10⁻ᶻ".

$$X = \frac{H^2/R}{1 + \sqrt{1-(1+k)(H/R)^2}} + A4H^4 + A6H^6 + A8H^8 + A10H^{10}$$

The exemplary embodiments of the present invention have been described above. However, it is to be understood that the present invention is not limited to the exemplary embodiments and various modifications and changes may be made without departing from the gist of the present invention.

<Interchangeable Lens>

| | | | | | | |
|---|---|---|---|---|---|---|
| Unit: mm | | | | | | |
| Surface data | | | | | | |
| Surface number | r | d | nd | vd | Effective diameter | θgF |
| 1* | 17,634.271 | 4.70 | 1.69680 | 55.5 | 183.19 | 0.5434 |
| 2 | 109.899 | 46.92 | | | 152.38 | |
| 3 | −201.325 | 4.50 | 1.69680 | 55.5 | 151.93 | 0.5434 |
| 4 | 1,829.577 | 0.15 | | | 155.00 | |
| 5 | 283.523 | 12.64 | 1.80518 | 25.4 | 158.03 | 0.6161 |
| 6 | 2,167.464 | 5.15 | | | 157.76 | |
| 7 | −2,805.896 | 18.49 | 1.48749 | 70.2 | 157.47 | 0.5300 |
| 8 | −196.467 | 0.20 | | | 157.29 | |
| 9 | −1,000.469 | 4.40 | 1.80518 | 25.4 | 149.49 | 0.6161 |
| 10 | 603.998 | 16.55 | 1.48749 | 70.2 | 146.78 | 0.5300 |
| 11 | −307.782 | 32.56 | | | 146.03 | |
| 12 | 315.156 | 17.48 | 1.48749 | 70.2 | 155.94 | 0.5300 |
| 13 | −596.320 | 0.15 | | | 156.09 | |
| 14 | 191.137 | 4.40 | 1.80518 | 25.4 | 155.18 | 0.6161 |
| 15 | 118.065 | 0.39 | | | 149.21 | |
| 16 | 119.291 | 35.44 | 1.48749 | 70.2 | 149.24 | 0.5300 |
| 17 | −534.936 | 0.15 | | | 148.58 | |
| 18* | 200.940 | 12.13 | 1.62041 | 60.3 | 141.59 | 0.5427 |
| 19 | 826.607 | (Variable) | | | 140.30 | |
| 20 | 129.425 | 1.50 | 1.88300 | 40.8 | 52.29 | 0.5667 |
| 21 | 64.705 | 6.90 | | | 48.69 | |
| 22 | −200.592 | 1.50 | 1.72916 | 54.7 | 47.84 | 0.5444 |
| 23 | 41.776 | 10.46 | 1.84666 | 23.8 | 43.43 | 0.6205 |
| 24 | −106.134 | 1.50 | 1.72916 | 54.7 | 42.53 | 0.5444 |
| 25 | 86.715 | 6.25 | | | 41.00 | |
| 26 | −81.264 | 1.50 | 1.88300 | 40.8 | 40.91 | 0.5667 |
| 27 | 227.627 | (Variable) | | | 41.93 | |
| 28 | 600.754 | 6.75 | 1.62041 | 60.3 | 51.99 | 0.5427 |
| 29 | −114.148 | 0.15 | | | 52.85 | |
| 30 | 117.668 | 11.71 | 1.48749 | 70.2 | 53.85 | 0.5300 |
| 31 | −75.558 | 0.09 | | | 53.66 | |
| 32 | −76.874 | 1.60 | 1.80518 | 25.4 | 53.57 | 0.6161 |
| 33 | −134.820 | 0.15 | | | 53.89 | |
| 34 | 86.226 | 1.60 | 1.80518 | 25.4 | 52.65 | 0.6161 |
| 35 | 48.805 | 10.30 | 1.48749 | 70.2 | 50.88 | 0.5300 |
| 36 | 2,324.271 | 0.15 | | | 50.18 | |
| 37 | 94.552 | 6.65 | 1.62041 | 60.3 | 49.18 | 0.5427 |
| 38 | −6,865.358 | (Variable) | | | 47.86 | |
| 39 (Stop) | ∞ | 3.42 | | | 29.98 | |
| 40 | −46.195 | 1.50 | 1.77250 | 49.6 | 29.29 | 0.5520 |
| 41 | 36.572 | 7.11 | 1.78472 | 25.7 | 28.98 | 0.6161 |
| 42 | −43.549 | 1.50 | 1.77250 | 49.6 | 28.89 | 0.5520 |
| 43 | 69.864 | 5.93 | | | 28.57 | |
| 44 | −41.024 | 19.74 | 1.77250 | 49.6 | 28.98 | 0.5520 |
| 45 | −41.228 | 8.40 | | | 37.08 | |
| 46 | −195.562 | 4.78 | 1.62041 | 60.3 | 37.58 | 0.5427 |
| 47 | −59.391 | 0.20 | | | 37.84 | |
| 48 | 277.984 | 1.80 | 1.88300 | 40.8 | 36.81 | 0.5667 |
| 49 | 37.998 | 7.73 | 1.48749 | 70.2 | 35.68 | 0.5300 |
| 50 | −82.491 | 0.20 | | | 35.71 | |
| 51 | 81.354 | 8.17 | 1.48749 | 70.2 | 34.96 | 0.5300 |
| 52 | −31.106 | 1.80 | 1.83400 | 37.2 | 34.70 | 0.5776 |
| 53 | −201.103 | 0.20 | | | 35.02 | |
| 54 | 180.091 | 6.65 | 1.48749 | 70.2 | 34.93 | 0.5300 |
| 55 | −40.373 | 5.00 | | | 34.74 | |

-continued

| Unit: mm | | | | | | |
|---|---|---|---|---|---|---|
| 56 | ∞ | 33.00 | 1.60859 | 46.4 | 40.00 | 0.5664 |
| 57 | ∞ | 13.20 | 1.51633 | 64.2 | 40.00 | 0.5352 |
| 58 | ∞ | 12.00 | | | 40.00 | |
| Image plane | ∞ | | | | | |

Aspherical surface data

First surface

K = 1.68492e+004  A4 = 2.64785e−008  A6 = −1.47610e−012
A8 = 8.96960e−017  A10 = −3.30657e−021

Eighteenth surface

K = −1.44619e−001  A4 = −7.46282e−009  A6 = −2.04300e−013
A8 = 1.70939e−017  A10 = −3.75331e−021

Various data

| | |
|---|---|
| Focal length | 6.70 |
| f-number | 1.50 |
| Half angle of view | 39.38 |
| Image height | 5.50 |
| Total lens length | 589.19 |
| BF | 46.17 |
| d19 | 3.93 |
| d27 | 173.49 |
| d38 | 1.30 |
| Entrance pupil position | 107.96 |
| Exit pupil position | 328.64 |
| Front principal point position | 114.80 |
| Rear principal point position | 5.30 |

Zoom lens unit data

| Unit | First surface | Focal length | Lens unit structure length | Front principal point position | Rear principal point position |
|---|---|---|---|---|---|
| 1 | 1 | 120.59 | 216.39 | 131.11 | 72.76 |
| 2 | 20 | −30.00 | 29.61 | 13.82 | −6.54 |
| 3 | 28 | 50.00 | 39.16 | 11.50 | −15.21 |
| 4 | 39 | 40.05 | 130.33 | 45.82 | 10.33 |

Numerical Embodiment 1

| Unit: mm | | | | | |
|---|---|---|---|---|---|

Surface data

| Surface number | r | d | nd | vd | Effective diameter | θgF |
|---|---|---|---|---|---|---|
| 56 | 135.405 | 2.00 | 1.88300 | 40.8 | 27.42 | 0.5667 |
| 57 | 27.120 | 2.00 | | | 25.57 | |
| 58 | 29.095 | 6.57 | 1.73800 | 32.3 | 25.84 | 0.5899 |
| 59 | −54.825 | 2.00 | 1.88300 | 40.8 | 25.15 | 0.5667 |
| 60 | 47.451 | 21.19 | | | 23.83 | |
| 61 | −608.566 | 2.00 | 1.85150 | 40.8 | 22.96 | 0.5695 |
| 62 | 17.259 | 5.78 | 1.67270 | 32.1 | 22.92 | 0.5988 |
| 63 | 90.246 | 2.00 | | | 23.33 | |
| 64 | 59.705 | 7.82 | 1.64769 | 33.8 | 24.64 | 0.5938 |
| 65 | −19.457 | 2.00 | 2.00100 | 29.1 | 24.91 | 0.5997 |
| 66 | 55.374 | 0.95 | | | 28.09 | |
| 67 | 49.421 | 2.00 | 1.95906 | 17.5 | 31.59 | 0.6598 |
| 68 | 23.915 | 15.22 | 1.85478 | 24.8 | 33.44 | 0.6122 |
| 69 | −30.680 | 13.00 | | | 34.83 | |
| Image plane | ∞ | | | | | |

-continued

| Unit: mm |
|---|

Various data

| | |
|---|---|
| Focal length | 18.03 |
| f-number | 4.03 |
| Half angle of view | 39.38 |
| Image height | 14.80 |
| BF | 13.00 |
| Entrance pupil position | 107.96 |
| Exit pupil position | 498.78 |
| Front principal point position | 126.65 |
| Rear principal point position | −5.03 |

Numerical Embodiment 2

| Unit: mm | | | | | |
|---|---|---|---|---|---|

Surface data

| Surface number | r | d | nd | vd | Effective diameter | θgF |
|---|---|---|---|---|---|---|
| 56 | 382.090 | 2.00 | 1.88300 | 40.8 | 24.00 | 0.5667 |
| 57 | 24.951 | 3.21 | 1.64769 | 33.8 | 22.66 | 0.5938 |
| 58 | 51.528 | 16.04 | | | 22.24 | |
| 59 | 825.127 | 2.00 | 1.83481 | 42.7 | 21.52 | 0.5648 |
| 60 | 14.624 | 9.70 | 1.78472 | 25.7 | 21.12 | 0.6161 |
| 61 | −50.294 | 2.00 | | | 21.10 | |
| 62 | −30.428 | 2.00 | 2.00100 | 29.1 | 20.80 | 0.5997 |
| 63 | 18.485 | 6.28 | 1.72825 | 28.5 | 22.53 | 0.6077 |
| 64 | 130.009 | 5.00 | | | 24.11 | |
| 65 | 49.326 | 2.00 | 1.95906 | 17.5 | 33.67 | 0.6598 |
| 66 | 30.693 | 13.81 | 1.65412 | 39.7 | 34.36 | 0.5737 |
| 67 | −28.043 | 13.68 | | | 35.47 | |
| Image plane | ∞ | | | | | |

| | |
|---|---|
| Focal length | 18.03 |
| f-number | 4.03 |
| Half angle of view | 39.38 |
| Image height | 14.80 |
| BF | 13.68 |
| Entrance pupil position | 107.96 |
| Exit pupil position | 632.39 |
| Front principal point position | 126.51 |
| Rear principal point position | −4.35 |

Numerical Embodiment 3

| Unit: mm | | | | | |
|---|---|---|---|---|---|

Surface data

| Surface number | r | d | nd | vd | Effective diameter | θgF |
|---|---|---|---|---|---|---|
| 56 | 257.849 | 2.00 | 1.75500 | 52.3 | 25.42 | 0.5475 |
| 57 | 28.260 | 5.78 | | | 23.79 | |
| 58 | 50.279 | 5.96 | 1.73800 | 32.3 | 23.89 | 0.5899 |
| 59 | −29.540 | 2.00 | 1.88300 | 40.8 | 23.48 | 0.5667 |
| 60 | 56.402 | 18.79 | | | 22.86 | |
| 61 | −96.422 | 3.00 | 1.88300 | 40.8 | 25.55 | 0.5667 |
| 62 | 22.450 | 9.65 | 1.69895 | 30.1 | 27.34 | 0.6030 |
| 63 | −41.939 | 0.20 | | | 28.43 | |
| 64 | −122.696 | 8.36 | 1.63980 | 34.5 | 28.86 | 0.5922 |
| 65 | −18.560 | 2.00 | 1.80518 | 25.4 | 29.34 | 0.6161 |
| 66 | −258.825 | 3.80 | | | 33.01 | |

-continued

Unit: mm

| | | | | | | |
|---|---|---|---|---|---|---|
| 67 | 193.347 | 2.00 | 1.89286 | 20.4 | 36.55 | 0.6393 |
| 68 | 42.189 | 12.38 | 1.80000 | 29.8 | 37.94 | 0.6017 |
| 69 | −35.603 | 13.00 | | | 38.63 | |
| Image plane | ∞ | | | | | |

| | |
|---|---|
| Focal length | 18.03 |
| f-number | 4.03 |
| Half angle of view | 39.38 |
| Image height | 14.80 |
| BF | 13.00 |
| Entrance pupil position | 107.96 |
| Exit pupil position | 125.44 |
| Front principal point position | 128.88 |
| Rear principal point position | −5.03 |

Numerical Embodiment 4

Unit: mm

Surface data

| Surface number | r | d | nd | vd | Effective diameter | θgF |
|---|---|---|---|---|---|---|
| 56 | −225.568 | 2.00 | 1.88300 | 40.8 | 25.75 | 0.5667 |
| 57 | 26.692 | 3.48 | | | 25.75 | |
| 58 | 37.845 | 2.00 | 2.00100 | 29.1 | 23.71 | 0.5997 |
| 59 | 22.349 | 6.87 | 1.76182 | 26.5 | 23.44 | 0.6136 |
| 60 | −47.131 | 7.26 | | | 23.60 | |
| 61 | −65.561 | 2.97 | 2.00100 | 29.1 | 21.49 | 0.5997 |
| 62 | 29.325 | 10.49 | 1.59270 | 35.3 | 21.71 | 0.5933 |
| 63 | −18.949 | 0.20 | | | 22.89 | |
| 64 | −20.110 | 2.00 | 2.00100 | 29.1 | 22.58 | 0.5997 |
| 65 | 50.273 | 10.00 | 1.76182 | 26.5 | 25.59 | 0.6136 |
| 66 | −39.598 | 7.40 | | | 28.81 | |
| 67 | −63.500 | 2.00 | 1.80810 | 22.8 | 32.17 | 0.6307 |
| 68 | 215.324 | 8.33 | 1.73800 | 32.3 | 34.38 | 0.5899 |
| 69 | −30.748 | 45.00 | | | 35.38 | |
| Image plane | ∞ | | | | | |

| | |
|---|---|
| Focal length | 17.10 |
| f-number | 3.82 |
| Half angle of view | 39.38 |
| Image height | 14.04 |
| BF | 45.00 |
| Entrance pupil position | 107.96 |
| Exit pupil position | 2,771.11 |
| Front principal point position | 125.17 |
| Rear principal point position | 27.90 |

Numerical Embodiment 5

Unit: mm

Surface data

| Surface number | r | d | nd | vd | Effective diameter | θgF |
|---|---|---|---|---|---|---|
| 56 | 344.687 | 2.00 | 1.95375 | 32.3 | 24.70 | 0.5898 |
| 57 | 32.148 | 1.69 | | | 23.37 | |
| 58 | 50.115 | 6.95 | 1.80518 | 25.4 | 23.44 | 0.6161 |
| 59 | −28.227 | 2.00 | 1.88300 | 40.8 | 22.90 | 0.5667 |
| 60 | 63.719 | 16.78 | | | 22.22 | |
| 61 | 102.144 | 2.00 | 2.00100 | 29.1 | 23.45 | 0.5997 |
| 62 | 15.055 | 11.35 | 1.76182 | 26.5 | 22.93 | 0.6136 |

-continued

Unit: mm

| | | | | | | |
|---|---|---|---|---|---|---|
| 63 | −20.532 | 2.00 | 1.95375 | 32.3 | 23.52 | 0.5898 |
| 64 | 46.026 | 2.76 | | | 26.19 | |
| 65 | 58.781 | 5.84 | 1.80518 | 25.4 | 32.35 | 0.6161 |
| 66 | 1,390.014 | 1.96 | | | 34.01 | |
| 67 | 166.839 | 2.00 | 2.10195 | 16.8 | 36.59 | 0.6719 |
| 68 | 40.267 | 17.67 | 1.73800 | 32.3 | 40.04 | 0.5899 |
| 69 | −29.026 | 11.51 | | | 42.91 | |
| Image plane | ∞ | | | | | |

| | |
|---|---|
| Focal length | 21.07 |
| f-number | 4.71 |
| Half angle of view | 39.38 |
| Image height | 17.30 |
| BF | 11.51 |
| Entrance pupil position | 107.96 |
| Exit pupil position | 280.83 |
| Front principal point position | 130.68 |
| Rear principal point position | −9.56 |

Numerical Embodiment 6

Unit: mm

Surface data

| Surface number | r | d | nd | vd | Effective diameter | θgF |
|---|---|---|---|---|---|---|
| 56 | −346.269 | 2.00 | 1.88300 | 40.8 | 23.52 | 0.5667 |
| 57 | 18.828 | 5.84 | 1.58144 | 40.8 | 21.93 | 0.5774 |
| 58 | 36.405 | 12.87 | | | 21.80 | |
| 59 | 33.147 | 3.38 | 1.92286 | 18.9 | 25.46 | 0.6495 |
| 60 | 70.503 | 2.62 | 1.43875 | 94.9 | 24.94 | 0.5340 |
| 61 | 17.622 | 16.41 | | | 23.55 | |
| 62 | 65.277 | 10.00 | 1.65160 | 58.5 | 30.60 | 0.5425 |
| 63 | −22.344 | 2.00 | 1.95906 | 17.5 | 30.81 | 0.6598 |
| 64 | −28.509 | 9.00 | | | 32.00 | |
| Image plane | ∞ | | | | | |

| | |
|---|---|
| Focal length | 14.00 |
| f-number | 3.13 |
| Half angle of view | 39.38 |
| Image height | 11.50 |
| BF | 9.00 |
| Entrance pupil position | 107.96 |
| Exit pupil position | 79.69 |
| Front principal point position | 124.73 |
| Rear principal point position | −5.00 |

Numerical Embodiment 7

Unit: mm

Surface data

| Surface number | r | d | nd | vd | Effective diameter | θgF |
|---|---|---|---|---|---|---|
| 56 | −506.287 | 2.00 | 1.91082 | 35.3 | 22.96 | 0.5824 |
| 57 | 21.055 | 3.51 | 1.68893 | 31.1 | 21.50 | 0.6004 |
| 58 | 40.730 | 5.00 | | | 21.16 | |
| 59 | 92.206 | 5.68 | 1.76182 | 26.5 | 21.47 | 0.6136 |
| 60 | −20.422 | 3.00 | 1.88300 | 40.8 | 21.35 | 0.5667 |
| 61 | 23.558 | 3.79 | 1.59551 | 39.2 | 21.54 | 0.5803 |
| 62 | 64.900 | 9.98 | | | 22.00 | |
| 63 | 50.837 | 10.00 | 1.67300 | 38.1 | 28.52 | 0.5754 |

-continued

Unit: mm

| | | | | | | |
|---|---|---|---|---|---|---|
| 64 | −20.320 | 2.53 | 1.84666 | 23.8 | 28.70 | 0.6205 |
| 65 | −33.842 | 15.05 | | | 29.98 | |
| Image plane | ∞ | | | | | |

| | |
|---|---|
| Focal length | 14.00 |
| f-number | 3.13 |
| Half angle of view | 39.38 |
| Image height | 11.50 |
| BF | 15.05 |
| Entrance pupil position | 107.96 |
| Exit pupil position | 268.94 |
| Front principal point position | 122.73 |
| Rear principal point position | 1.05 |

TABLE 1

| | Numerical Embodiment | | | | | | |
|---|---|---|---|---|---|---|---|
| Conditional Expression | 1 | 2 | 3 | 4 | 5 | 6 | 7 |
| (1) L/x | 2.49 | 2.50 | 3.03 | 2.21 | 3.15 | 2.48 | 2.23 |
| (2) L/y | 5.50 | 4.68 | 5.84 | 1.44 | 6.51 | 5.90 | 3.02 |
| (5) f_neg/f_conv | −0.22 | −0.28 | −1.00 | 0.02 | −0.55 | −3.55 | −0.44 |
| (6) β | 2.69 | 2.69 | 2.69 | 2.55 | 3.15 | 2.09 | 2.09 |
| (7) (θrp_ave-θrn_ave)/(vrp_ave-vrn_ave) | −0.0045 | −0.0036 | −0.0033 | −0.0039 | −0.0065 | −0.0029 | −0.0031 |
| (8) Nn_ave | 1.92 | 1.92 | 1.84 | 1.94 | 1.98 | 1.76 | 1.88 |
| (9) L/frear_Lc | 2.81 | 1.97 | 1.86 | 0.83 | 1.77 | 1.53 | 1.29 |
| (10) ffront_Lc/frear_Lc | −1.51 | −1.55 | −1.03 | −0.34 | −0.87 | −0.81 | −0.95 |
| (12) (θfp_ave-θfn_ave)/(vfp_ave-vfn_ave) | −0.0031 | −0.0033 | −0.0027 | −0.0071 | −0.0036 | −0.0017 | −0.0041 |
| L | 71.53 | 64.04 | 75.92 | 65.00 | 75.00 | 53.12 | 45.48 |
| x | 28.70 | 25.64 | 25.09 | 29.37 | 23.78 | 21.38 | 20.42 |
| y | 13.00 | 13.68 | 13.00 | 45.00 | 11.51 | 9.00 | 15.05 |
| f_neg | −49.60 | −88.27 | −42.41 | −59.87 | −47.91 | −126.53 | −65.09 |
| f_conv | 229.06 | 314.90 | 42.22 | −3,326.47 | 87.79 | 35.65 | 148.79 |
| θrp_ave | 0.60 | 0.59 | 0.60 | 0.60 | 0.60 | 0.54 | 0.58 |
| θrn_ave | 0.63 | 0.63 | 0.63 | 0.62 | 0.63 | 0.66 | 0.62 |
| vrp_ave | 29.30 | 34.07 | 32.15 | 29.39 | 28.84 | 58.55 | 38.15 |
| vrn_ave | 23.30 | 23.30 | 22.89 | 25.95 | 24.55 | 17.47 | 23.78 |
| frear_Lc | 25.46 | 32.48 | 40.73 | 77.86 | 42.41 | 34.71 | 35.28 |
| ffront_Lc | −38.52 | −50.23 | −42.00 | −26.77 | −37.02 | −28.13 | −33.42 |
| θfp_ave | 0.59 | 0.60 | 0.60 | 0.60 | 0.61 | 0.61 | 0.60 |
| θfn_ave | 0.57 | 0.57 | 0.56 | 0.59 | 0.59 | 0.55 | 0.57 |
| vfp_ave | 32.18 | 29.74 | 31.20 | 30.92 | 25.97 | 29.83 | 32.28 |
| vfn_ave | 40.77 | 41.75 | 44.61 | 33.01 | 34.07 | 67.85 | 38.01 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-123968, filed Jun. 26, 2017, which is hereby incorporated by reference herein in its entirety.

What is claimed is:

1. A converter lens arrangeable between an interchangeable lens as an image pickup optical system and an image pickup apparatus for picking up an image formed by the interchangeable lens and the converter lens, the converter lens comprising:
a plurality of lenses,
wherein the following conditional expressions are satisfied:

$$1.1 < L/x < 3.3; \text{ and}$$

$$1.0 < L/y < 8.0,$$

where x is a distance on an optical axis from a lens surface vertex closest to an object side in the converter lens to an image point of the interchangeable lens alone arranged at a position where the interchangeable lens is mounted to the converter lens, L is a distance on the optical axis from the lens surface vertex closest to the object side to a lens surface vertex closest to an image side in the converter lens, and y is an air-equivalent back focus in a state where the converter lens is mounted to the interchangeable lens, wherein the plurality of lenses include a rear lens unit consisting of lenses each satisfying the following conditional expression:

$$LN > 0.5 \times L,$$

where LN is a distance on the optical axis from the lens surface vertex closest to the object side to a surface vertex on the object side of each of the plurality of lenses, wherein the lenses of the rear lens unit include at least one negative lens satisfying the following conditional expression:

$$\theta gF > -0.00162 \times vd + 0.654,$$

where θgF is a relative partial dispersion, and vd is an Abbe number with respect to a d-line of the at least one negative lens, wherein the following conditional expression is satisfied:

$$-5.0 < f\_neg/f\_conv < 0.6,$$

where f_neg is an average value of a focal length of the at least one negative lens, and f_conv is a focal length of the converter lens, wherein the plurality of lenses include one of a single lens or a cemented lens having a negative refractive power and arranged closest to the object side, and one of a single lens or a cemented lens having a positive refractive power and arranged closest to the image side of all single lenses or cemented lenses having positive refractive powers, and the following conditional expression is satisfied:

$$-2.5 < f\text{front\_Lc}/f\text{rear\_Lc} < -0.3,$$

where ffront_Lc is a focal length of the one of the single lens or the cemented lens having a negative refractive power, frear_Lc is a focal length of one of the single lens or the cemented lens having the positive refractive power, and wherein the Abbe number vd and the relative partial dispersion θgF are respectively defined as:

$$vd=(Nd-1)/(NF-NC);\text{ and}$$

$$\theta gF=(Ng-NF)/(NF-NC),$$

where Ng, NF, Nd, and NC are refractive indices at a g-line having a wavelength of 435.8 nm, an F-line having a wavelength of 486.1 nm, a d-line having a wavelength of 587.6 nm, and a C-line having a wavelength of 656.3 nm of Fraunhofer lines, respectively.

2. The converter lens according to claim 1, wherein the following conditional expression is satisfied:

$$2<\beta<3.5,$$

where β is a lateral magnification of the converter lens.

3. The converter lens according to claim 1, wherein: the plurality of lenses include negative lenses, and the following conditional expression is satisfied:

$$1.75<Nn\_\text{ave}<2.05,$$

where Nn_ave is an average value of refractive indices of the negative lenses included in the plurality of lenses.

4. The converter lens according to claim 1, wherein: the plurality of lenses include one of a single lens or a cemented lens having a positive refractive power and arranged closest to the image side of all single lenses or cemented lenses having positive refractive powers, and the following conditional expression is satisfied:

$$0.8<L/f\text{rear\_Lc}<4.0.$$

5. The converter lens according to claim 1, wherein the lenses of the rear lens unit include at least one positive lens satisfying the following conditional expression:

$$\theta gF\_n<-0.00256\times vd+0.679,$$

where θgF_n is a relative partial dispersion of the at least one positive lens.

6. The converter lens according to claim 1, wherein: the plurality of lenses include a front lens unit consisting of lenses other than the rear lens unit of the plurality of lenses, the lenses of the front lens unit including negative lenses and positive lenses, and the following conditional expression is satisfied:

$$-0.0085<(\theta fp-\theta fn)/(vfp-vfn)<-0.0016,$$

where vfp and θfp are an average value of Abbe numbers of the positive lenses of the front lens unit and an average value of relative partial dispersions of the positive lenses of the front lens unit, respectively, and vfn and θfn are an average value of Abbe numbers of the negative lenses of the front lens unit and an average value of relative partial dispersions of the negative lenses of the front lens unit, respectively.

7. The converter lens according to claim 1, wherein a lens surface closest to the image side in the converter lens is convex toward the image side.

8. The converter lens according to claim 1, the plurality of lenses include three positive lenses and three negative lenses.

9. The converter lens according to claim 1, wherein the lenses of the rear lens unit include positive lenses and negative lenses satisfying the following conditional expression:

$$-0.0091<(\theta rp-\theta rn)/(vrp-vrn)<-0.0025,$$

where vrp and θrp are an average value of Abbe numbers of the positive lenses thereof and an average value of relative partial dispersions of the positive lenses, thereof, respectively, and vrn and θrn are an average value of Abbe numbers of the negative lenses thereof and an average value of relative partial dispersions of the negative lenses thereof, respectively.

10. A camera apparatus comprising:
an image pickup apparatus; and
a converter lens arrangeable between an interchangeable lens as an image pickup optical system and the image pickup apparatus for picking up an image formed by the interchangeable lens and the converter lens, the converter lens comprising:
a plurality of lenses,
wherein the following conditional expressions are satisfied:

$$1.1<L/x<3.3;\text{ and}$$

$$1.0<L/y<8.0,$$

where x is a distance on an optical axis from a lens surface vertex closest to an object side in the converter lens to an image point of the interchangeable lens alone arranged at a position where the interchangeable lens is mounted to the converter lens, L is a distance on the optical axis from the lens surface vertex closest to the object side to a lens surface vertex closest to an image side in the converter lens, and y is an air-equivalent back focus in a state where the converter lens is mounted to the interchangeable lens, wherein the plurality of lenses include a rear lens unit consisting of lenses each satisfying the following conditional expression:

$$LN>0.5\times L,$$

where LN is a distance on the optical axis from the lens surface vertex closest to the object side to a surface vertex on the object side of each of the plurality of lenses, wherein the lenses of the rear lens unit include at least one negative lens satisfying the following conditional expression:

$$\theta gF>-0.00162\times vd+0.654,$$

where θgF is a relative partial dispersion, and vd is an Abbe number with respect to a d-line of the at least one negative lens, wherein the following conditional expression is satisfied:

$$-5.0<f\_\text{neg}/f\_\text{conv}<0.6,$$

where f_neg is an average value of a focal length of the at least one negative lens, and f_conv is a focal length of the converter lens, wherein the plurality of lenses include one of a single lens or a cemented lens having a negative refractive power and arranged closest to the object side, and one of a single lens or a cemented lens having a positive refractive power and arranged closest to the image side of all single lenses or cemented lenses having positive refractive powers, and the following conditional expression is satisfied:

$-2.5 < f\text{front}\_Lc/f\text{rear}\_Lc < -0.3$, where ffront_Lc is a focal length of the one of the single lens or the cemented lens having a negative refractive power, frear_LC is a focal length of one of the single lens or the cemented lens having the positive refractive power, and wherein the Abbe number νd and the relative partial dispersion θgF are respectively defined as:

$vd = (Nd-1)/(NF-NC)$; and $\theta gF = (Ng-NF)/(NF-NC)$, where Ng, NF, Nd, and NC are refractive indices at a g-line having a wavelength of 435.8 nm, an F-line having a wavelength of 486.1 nm, a d-line having a wavelength of 587.6 nm, and a C-line having a wavelength of 656.3 nm of Fraunhofer lines, respectively.

* * * * *